(12) United States Patent
Olszak et al.

(10) Patent No.: US 7,130,115 B2
(45) Date of Patent: Oct. 31, 2006

(54) MULTI-MODE SCANNING IMAGING SYSTEM

(75) Inventors: Artur G. Olszak, Tucson, AZ (US); Chen Liang, Tucson, AZ (US); Michael R. Descour, Tuscon, AZ (US)

(73) Assignee: Dhetrix, Inc., Tucson, AZ (US)

( * ) Notice: Subject to any disclaimer, the term of this patent is extended or adjusted under 35 U.S.C. 154(b) by 0 days.

(21) Appl. No.: 10/666,990

(22) Filed: Sep. 19, 2003

(65) Prior Publication Data

US 2004/0057094 A1    Mar. 25, 2004

Related U.S. Application Data

(60) Provisional application No. 60/413,399, filed on Sep. 23, 2002.

(51) Int. Cl.
*G02B 21/18* (2006.01)

(52) U.S. Cl. .................. 359/372; 359/368; 250/208.1

(58) Field of Classification Search ............... 359/385, 359/368, 372; 250/208.1
See application file for complete search history.

(56) References Cited

U.S. PATENT DOCUMENTS

| | | | |
|---|---|---|---|
| 5,142,145 A | 8/1992 | Yasutake | |
| 6,016,185 A | 1/2000 | Cullman et al. | |
| 6,320,174 B1 | 11/2001 | Tafas et al. | |
| 6,320,697 B1 | 11/2001 | Takeuchi | |
| 6,571,118 B1 | 5/2003 | Utzinger et al. | |
| 6,633,662 B1 | 10/2003 | Ravkin | |
| 2004/0027688 A1* | 2/2004 | Lange | 359/726 |

FOREIGN PATENT DOCUMENTS

WO    WO 02/075370 A2    9/2002

OTHER PUBLICATIONS

Bella Bielorai et al., "Combined analysis of morphology and fluorescence in situ hybridization in follow-up of minimal residual disease in a child with Philadelphia-postivie acute lymphoblastic leukemia," Cancer Genetics and Cytogenetics, vol. 138 (2002), pp. 64-68.
Francisco Guzman et al., "Catheter Based Instrument for Simultaneous OCT Imaging and Fluorescence Spectroscopy," Proceedings of SPIE, vol. 4609 (2002), pp. 430-437.

* cited by examiner

*Primary Examiner*—Drew A. Dunn
*Assistant Examiner*—Joshua L. Pritchett
(74) *Attorney, Agent, or Firm*—Antonio R. Durando

(57) ABSTRACT

A multi-mode scanning imaging system. The system includes a plurality of sets of optical elements and a scanning mechanism. Each set is disposed with respect to a corresponding image plane and configured to image respective portions of an object. A scanning mechanism produces relative translation between the sets and the object so as to scan the object. Sets of image sensors corresponding to the sets of optical elements are adapted to capture image data representative of the respective portions of the object. A mode implementation system coordinates the image data according to one or more desired modes of operation of the imaging system.

14 Claims, 24 Drawing Sheets

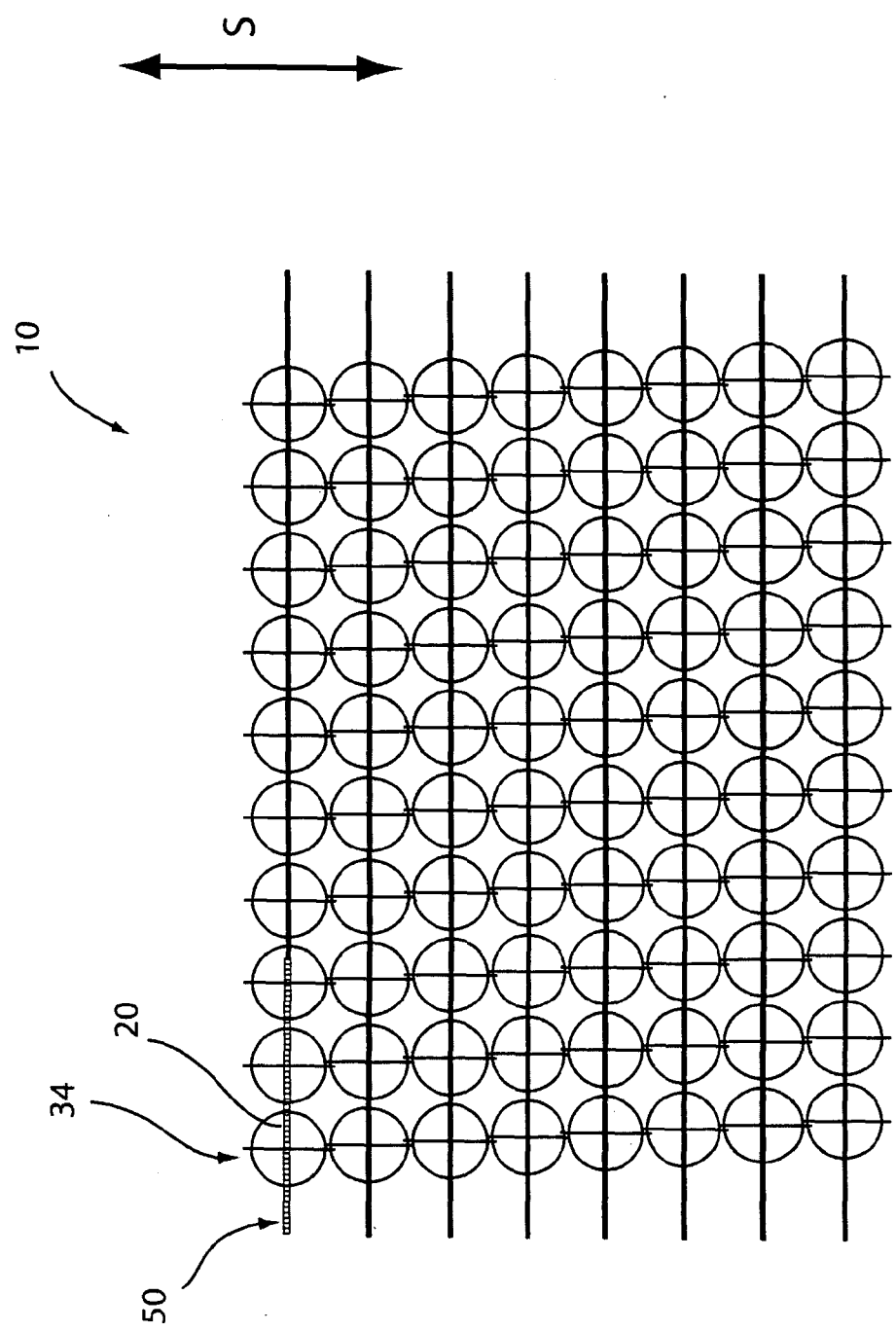

MULTI-MODE SCANNING IMAGING SYSTEM

CROSS REFERENCE TO RELATED APPLICATION

This application claims the benefit of the applicants' provisional application Ser. No. 60/413,399 filed Sep. 23, 2002, incorporated by reference herein in its entirety.

FIELD OF THE INVENTION

This invention relates to a scanning imaging system providing for multiple modalities of operation.

BACKGROUND

To obtain an image of an object, it is often necessary to scan the object by moving one of the object and the imaging system relative to the other. One common use in which this need arises is light microscopy, particularly where a tissue specimen is being imaged for diagnostic analysis; however, image scanning may be employed where there is no magnification, or where there is demagnification.

In microscopy, the need arises particularly when using conventional, single-axis, microscopes, where resolution must be traded off with the microscope's field of view ("FOV") i.e., the FOV must be decreased in order to increase resolution. Therefore, a microscope with an objective having a FOV that is too small to image an entire specimen at a desired resolution is often provided with a motorized stage for scanning the specimen. The motorized stage translates microscope slides to, sequentially, move one portion of the specimen into a field of view of the microscope and then another, to obtain respective image portions of the specimen. An image of the entire specimen, or selected portions greater than the microscope's field of view, may be assembled from the individual two-dimensional fields of view in a process known as "tiling."

This scanning is time-intensive. Moreover, the tiling process associated with this scanning exacts penalties in speed and reliability. Tiling requires computation overhead, and severe mechanical requirements are placed on the stage, e.g., to translate from one location to another accurately and to settle quickly for imaging, or tile alignment errors may be difficult or impossible to accurately correct. A most serious source of error results from differences in alignment between the line of sensors used for recording an image tile and the direction of horizontal slide transport provided by the scanning system.

Recently, a multi-axis imaging system has been developed employing an array of optical elements. Adapted for microscopy, the array is miniaturized to form a miniature microscope array ("microscope array").

The microscope array is able to obtain a microscopic image of all, or a large portion, of a relatively large specimen or object, such as the 20 mm×50 mm object area of a standard 1"×3" microscope slide. This is done by scanning the object line-by-line with an array of optical elements having associated arrays of detectors.

The optical elements are spaced a predetermined distance from one another, and the entire array and object are moved relative to one another so that the positional relationship between image data from the detectors is fixed, and data are thereby automatically aligned. This provides the outstanding advantage of eliminating the need for tiling.

Another outstanding advantage of the multi-axis imaging system is its speed. An entire specimen can be imaged in one pass because the FOV of the system can be arbitrarily large without sacrificing resolution. However, a mode of operation in which multiple passes are employed may still be needed where the dimensions of a given array are, for a given application, insufficient to cover the entire area of the object to be imaged in a single pass.

In complex scientific analysis, data from multiple sources are often combined to form a more complete perception of a phenomenon under observation. For example, in medical research, visual tissue information is combined with information about the presence or absence of certain chemical substances in the body of the tissue cells. The latter information may be obtained by use of fluorescent microscopy, two-photon microscopy, or multi-photon microscopy, to detect markers particular to the chemical compounds or biological structures under analysis. Researchers typically must use separate instruments to provide these different imaging modes of operation, which complicates data gathering and presents a problem of positionally correlating data from one instrument with the data from another.

Where conventional single-axis microscopes provide for multiple modes of operation, such as transmitted light and dark field illumination, the modes make use of common optical systems and cannot be used independently of one another, making positional correlation even more difficult as well as time consuming. Regarding multi-axis systems, while it is convenient using integrated manufacturing processes to fabricate arrays that realize a single imaging modality, it may not be practical or even possible to integrate manufacture of an array providing for a desired set of multiple imaging modalities.

Accordingly, there is a need for a multi-mode scanning imaging system that makes available the advantages of a multi-axis scanning imaging for multiple imaging modalities.

SUMMARY

Preferred embodiments of a multi-mode scanning imaging system are disclosed herein according to the present invention. The systems include a plurality of sets of optical elements and a scanning mechanism. Each set is disposed with respect to a corresponding image plane and configured to image respective portions of an object. A scanning mechanism produces relative translation between the sets and the object so as to scan the object. Sets of image sensors corresponding to the sets of optical elements are adapted to capture image data representative of the respective portions of the object. A mode implementation system combines the image data according to one or more desired modes of operation of the imaging system.

Objects, features and advantages of the invention will be more fully understood upon consideration of the following detailed description, taken in conjunction with the following drawings.

BRIEF DESCRIPTION OF THE DRAWINGS

FIG. 8 is a plan view of the microscope array of FIG. 1, showing microscope objectives and associated image sensors distributed in a linear array.

DETAILED DESCRIPTION

The present invention is particularly advantageous in miniature microscope arrays specifically, and in multi-axis imaging systems generally. Accordingly, preferred embodiments of the invention are described herein in the context of miniature microscope arrays, which are explained in detail below as general technical background. However, single-axis imaging systems adapted in accord with the principles described herein also fall within the scope of the invention, and imaging systems other than microscopes may be used without departing from the principles of the invention.

General Technical Background—Microscope Arrays

Figure 1:
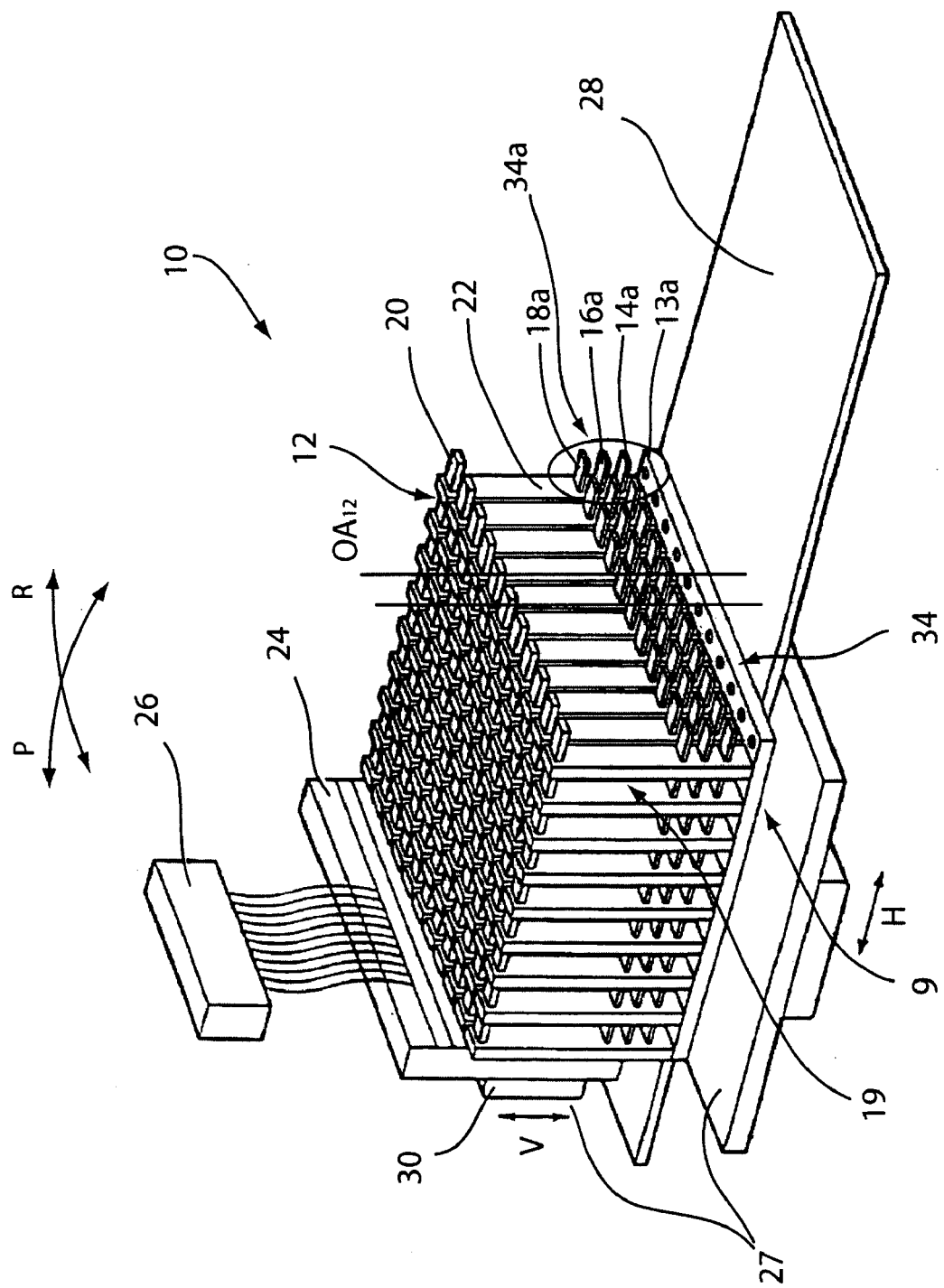
FIG. 1 is a pictorial view of an exemplary microscope array.

An exemplary miniature microscope array 10 is shown in FIG. 1. The microscope array may be used to scanningly image one object, or to simultaneously scanningly image multiple objects, in which case the microscope array may be more illustratively termed an array microscope. For purposes herein, there is no distinction intended between these two terms.

In this example, the microscope array is for scanning an object 28, which is shown as a microscope slide. Typically, a tissue specimen is mounted on the microscope slide in thin section, but the array 10 may be used to image any object.

Figure 2:
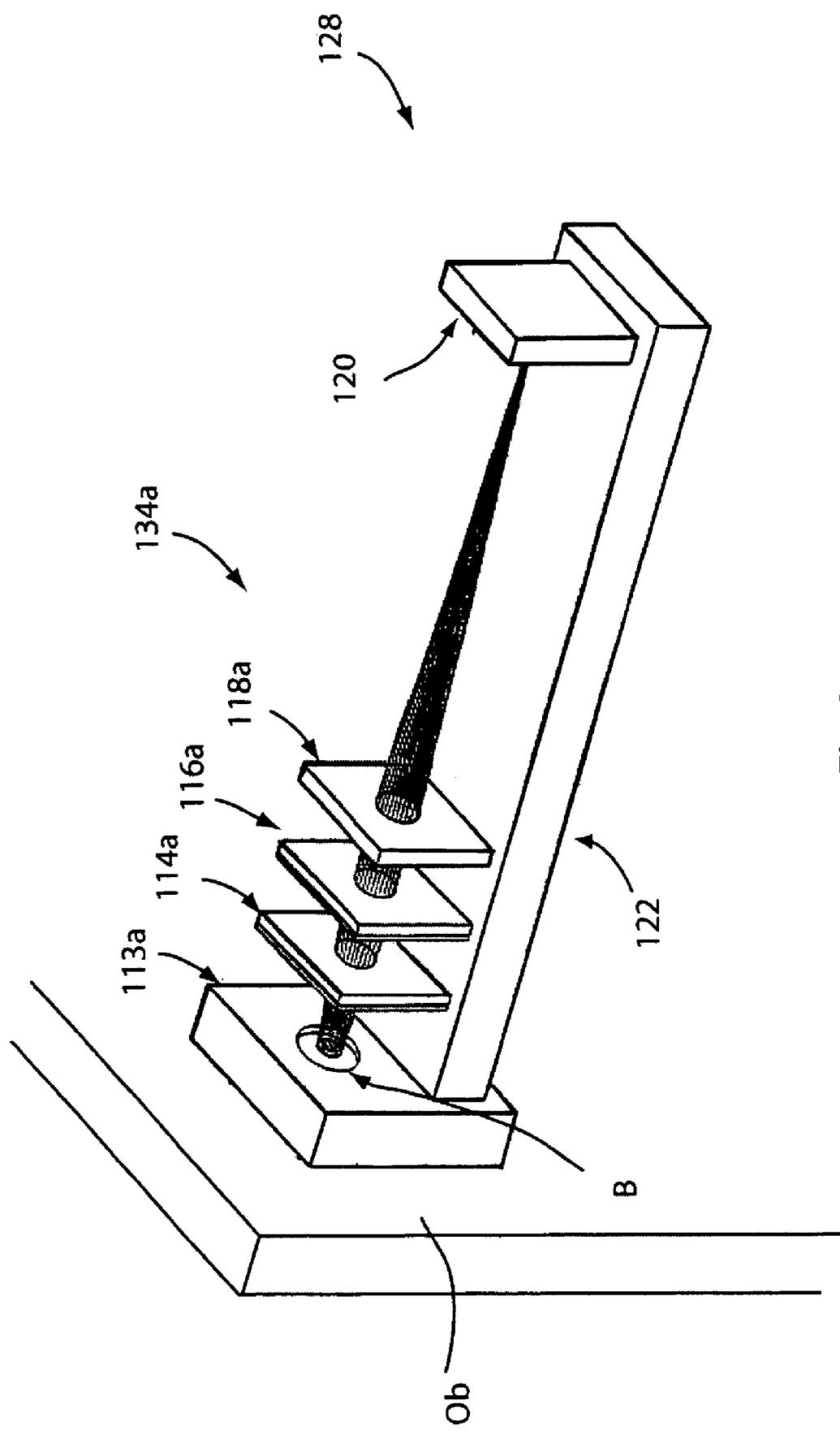
FIG. 2 is a pictorial view of a group of optical elements, or objective, of the microscope array of FIG. 1, shown in greater detail.
Figure 3:
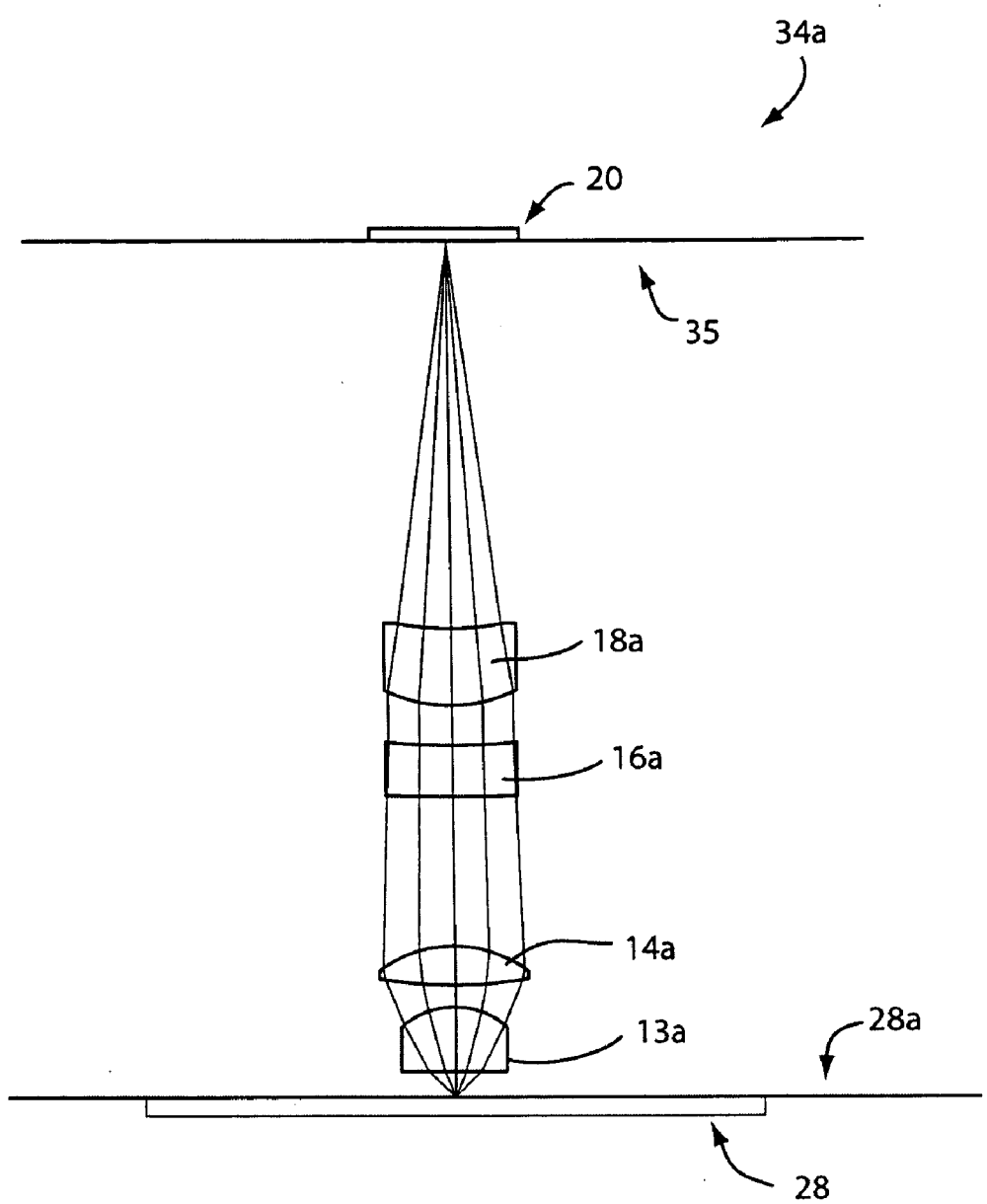
FIG. 3 is a schematic, ray-trace diagram of the objective of FIG. 2.

The array 10 comprises an optical system 9 that includes a set of optical elements 34. The optical elements 34 are provided in groups such as the optical elements 13a, 14a, 16a and 18a of the group 34a indicated in FIG. 1. FIG. 2 shows one of the groups 34a in greater detail, and FIG. 3 shows a schematic ray-trace diagram for the same group 34a. In this example, the optical elements 13a, 14a, 16a and 18a are all lenses, but other optical elements, such as polarizers, and stops may be provided, and more or fewer optical elements may be employed.

Turning back to FIG. 1, the optical elements of the optical system 9 are aligned so as to define respective optical imaging axes $OA_{12}$. The optical imaging axes of the array 10 are not collinear and thereby define a multi-axis system, though typically they are parallel to one another.

Each group 34a of optical elements is a miniature microscope objective for the microscope array, and is hereinafter referred to as an objective. An area of the object to be imaged is positioned with respect to the lens system 9 so that the area lies in the object planes of the corresponding objectives in the set.

The microscope array 10 typically employs visible light for imaging, but may use electromagnetic radiation of any wavelength. The light is provided by an illumination system (not shown), which may be one of two basic types. With the first type of illumination, known as "epi-illumination," light incident the object is reflected from the object into the optical system 9. With the second type of illumination, known as "trans-illumination," light is transmitted through the object into the lens system 9. Both types of illumination could be used in combination.

The microscope array 10 further comprises a sensing system 19 having a plurality of groups of image sensors 20, corresponding respectively to the objectives 34a. The image sensors 20 are positioned with respect to the lens system 9, such as by being mounted on supports 22, so that sensing elements (or areas) of the sensors 20 lie in the image planes of the objectives.

The image sensors 20 capture image data obtained from the interaction of the light with the object being imaged. With reference to FIG. 3, the light is imaged by the objective 34a from an object plane 28a onto an image plane 35. The image sensors are typically CCD or CMOS photodetector arrays, though alternative and additional sensing elements may be employed.

A height and pitch/roll adjustment mechanism 30 is provided to translate the object in the vertical direction "V," and to adjust the pitch "P" and roll "R" of the object, for focusing the array 10 on the object and accommodating any tip or tilt of the object. A scanning mechanism 27 is provided to translate the object laterally, e.g., in the horizontal direction "H," for scanning the object with the objectives 34a. The scanning mechanism is typically a motorized stage or carriage adapted to hold the object; however, it will be readily appreciated that the scanning mechanism may move the array 10 rather than the object to provide relative motion between the object and the array.

Scanning is preferably performed at a constant velocity ("continuous scanning"), though this is not essential, and step-and-image scanning may be employed where the mechanism 27 advances in increments that are not greater than the FOV of an individual objective 34a.

Figure 4:
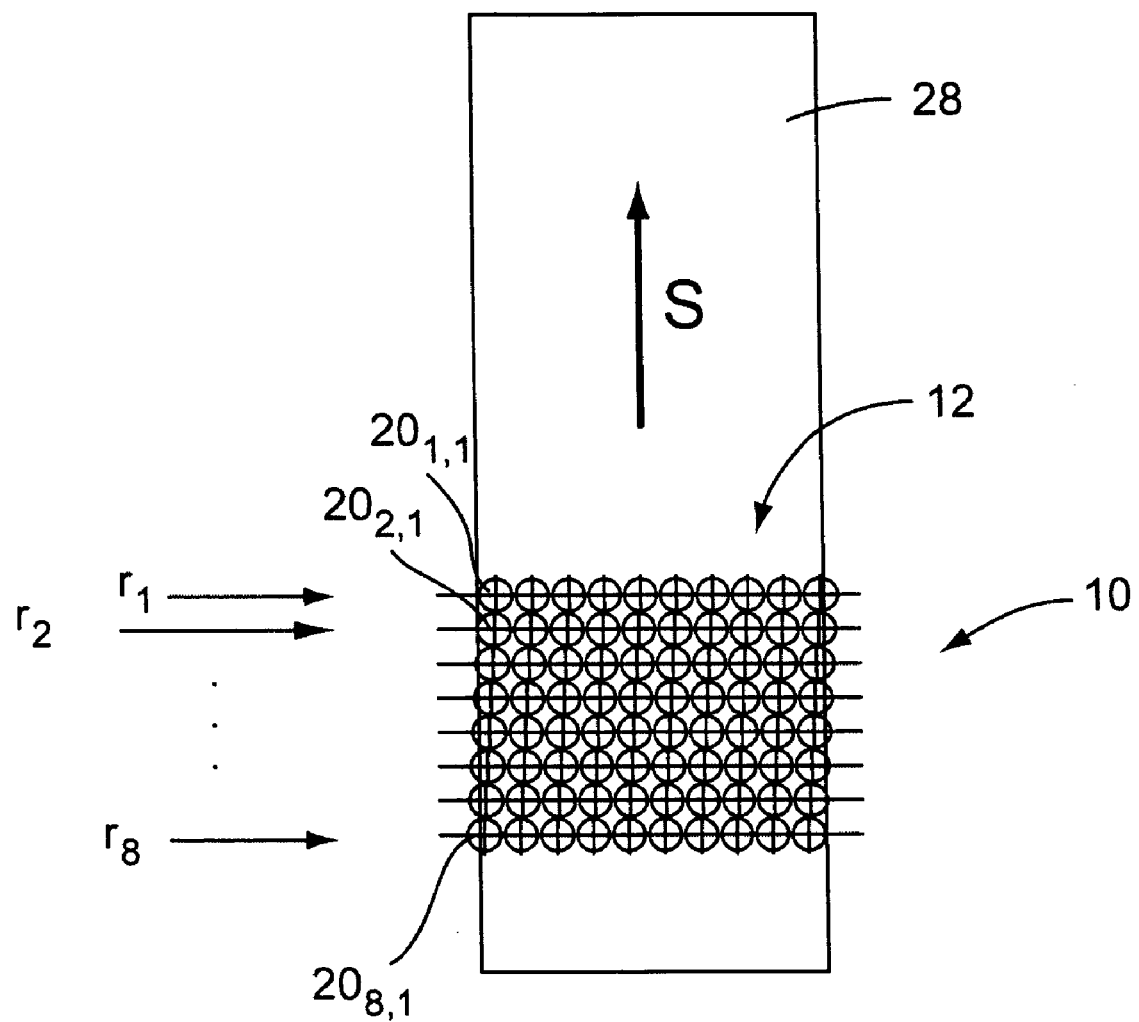
FIG. 4 is a plan view of the array of FIG. 1, showing objectives and image sensors.

FIG. 4 shows a plan view of the array 10 over a microscope slide 28. An exemplary array 10 includes one set of 80 objectives 34a arranged in 8 rows "r," specifically "$r_1$"–"$r_8$," of 10 objectives per row as an example. However, the total number objectives and their distribution among rows and columns can be varied as required.

The slide 28 is scanned by moving the slide in a scan direction "S" relative to the array 10. As can be seen, each row "r" of the array is staggered with respect to the adjacent row. For example, the row "$r_2$" is staggered slightly to the left of the row "$r_1$."

Figure 5:
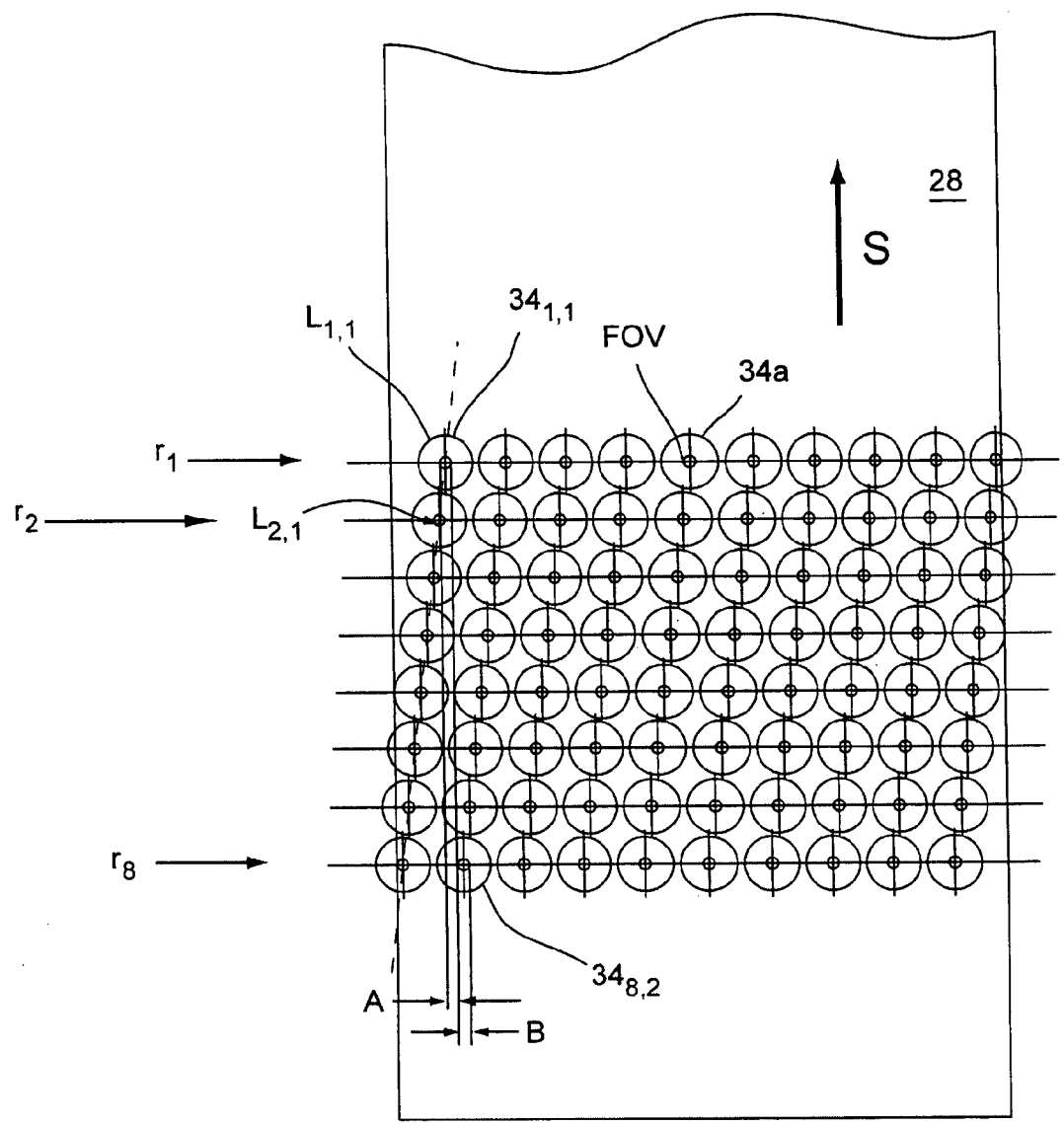
FIG. 5 is a plan view of the array of FIG. 1, showing objectives and their associated fields of view.

The reason for this is made apparent in FIG. 5. FIG. 5 shows the relatively large diameter of the objectives 34a, along with the much smaller fields of view ("FOV's") of the same objectives. Each objective 34a images a small FOV over a large sensing area of the associated image sensor 20 (not shown in FIG. 5) to provide the desired magnification. At any instant in time, only the 80 small FOV's in FIG. 5 are imaged. As the slide is scanned, however, each FOV defines a columnar image area, where, for example, the columnar image area "A" corresponding to moving the slide in the scan direction "S" past the first objective $34_{1,1}$ of the first row "$r_1$" is adjacent the columnar image area "B" corresponding to the second objective $34_{8,2}$ of the last row "$r_8$.' All 80 objectives are required to fill in the gaps between the FOV's corresponding to the first row of objectives as the slide is scanned to provide contiguous, seamless image strips or swaths of data.

The 80 objectives 34a of the example above correspond to a FOV of 250 μm for each objective and a spacing of 2.0 mm between adjacent objectives of the same row, providing for 50 μm of overlap, for scanning the 20 mm width of a standard microscope slide with overlap.

Returning to FIG. 1, the microscope array 10 is provided with an interface 24 for connecting outputs of the image sensors to a data processor or computer 26. Preferably, the scanning mechanism 27 and the height-adjustment mechanism are motorized, and the computer controls the motors for these mechanisms. Feedback control is not necessary but may be desirable.

The computer 26 also stores the image data produced by the sensors 20 of the sensing system 19. The computer concatenates the image data to produce a composite image of the object by re-ordering the data streaming from the array of image sensors. For example, given the scan direction "S," data from the first sensing element $20_{1,1}$ (FIG. 4) of the first row of the array 10 in FIG. 4, corresponding to the location $L_{1,1}$ of the object (FIG. 5) is obtained at a time "Δt" that precedes the time at which data from the first sensing element $20_{2,1}$ of the second row of the array 10 produces data corresponding to the adjacent location $L_{2,1}$ of the object. The time Δt is equal to the distance between the rows of the array divided by the scan velocity. Concatenating the image data, i.e., the columnar image areas associated with the sensing element $20_{1,1}$ and the sensing element $20_{2,1}$ of the array 10, can therefore be accomplished simply by delaying the output of the sensing element $20_{1,1}$ with respect to the output of the sensing element $20_{2,1}$ by Δt. Similarly, the columnar image areas A and B may be concatenated by delaying the columnar image area "B," corresponding to the sensing element $20_{8,2}$ by 8·Δt.

Alternatively, the computer 26 may concatenate the image data and thereby produce a composite image by storing the data in a memory. The data are stored in an ordered matrix representative of the locations of the sensing elements in the array from which the data came.

Figure 6:
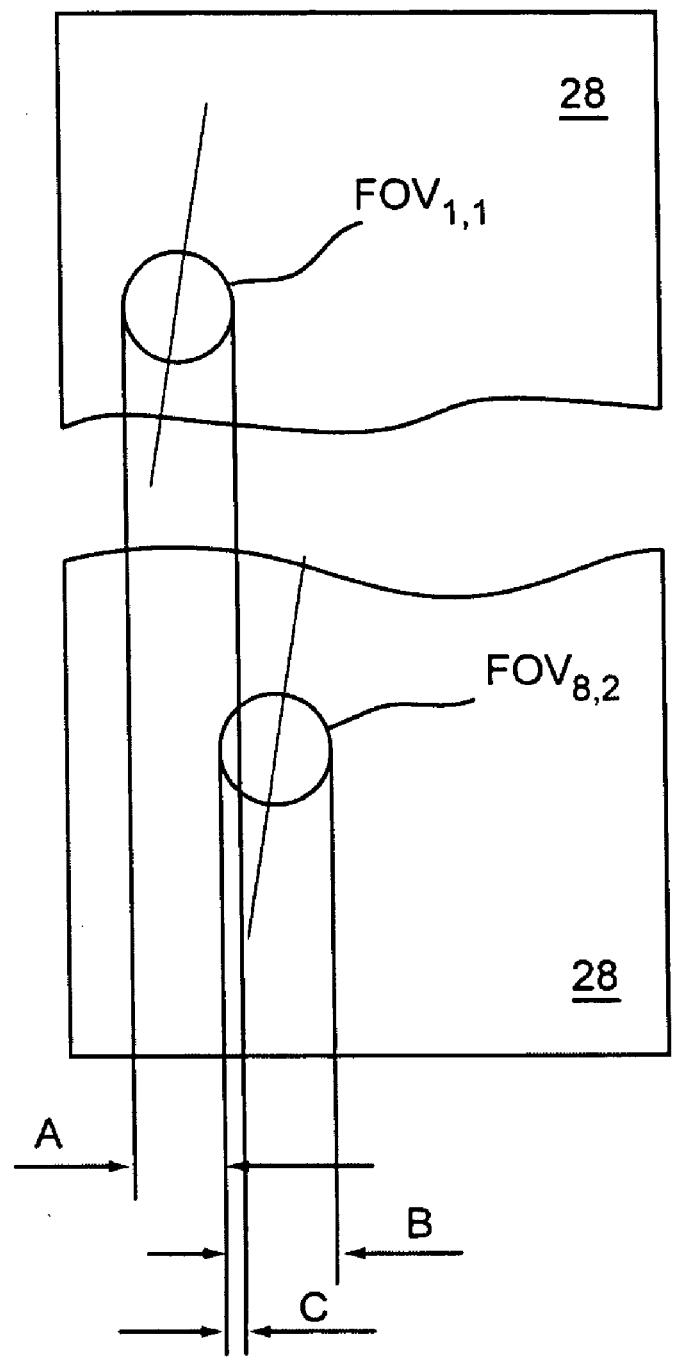
FIG. 6 is a plan view of the fields of view corresponding to two of the objectives of FIG. 5 shown in larger scale.

FIG. 6 shows the FOV's of the two exemplary objectives $34_{1,1}$ and $34_{8,2}$ discussed above, specifically $FOV_{1,1}$ and $FOV_{8,2}$ in larger scale. In the above description, it was assumed for simplicity of illustration that the lateral spacing between the objectives 34a was such that the FOV's, and the columnar image areas A and B that result from scanning, did not overlap. However, some overlap indicated by the columnar image area "C" is desirable to accommodate manufacturing tolerances in the imaging system 9 as well as in the sensing system 19. In a step of lateral alignment, the array can be calibrated to adjust this lateral overlap appropriately for the array 10, to eliminate redundant data.

Manufacturing tolerances also produce non-ideal spacing between the objectives in different rows, in the longitudinal or scan direction. In a step of longitudinal alignment, the array can be calibrated by delaying the output of the image sensors of one objective in one row with respect to the output of the image sensors of an adjacent objective in an adjacent row more or less than the delay that is indicated for the ideal case.

Figure 7:
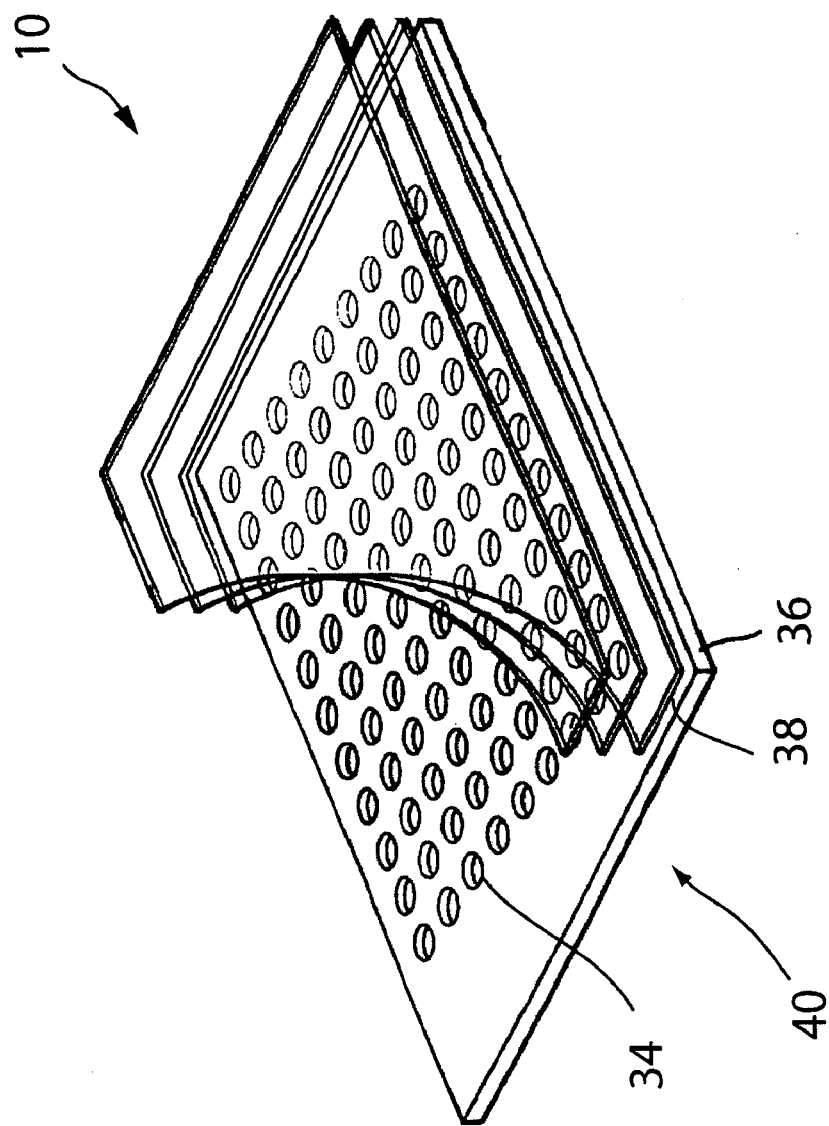
FIG. 7 is a pictorial view of a preferred construction of the microscope array of FIG. 1.

FIG. 7 illustrates a preferred construction of the objectives 34a for the array 10. One or more refractive plates or substrates 40, e.g., 36 and 38, having optical components 34 are stacked one on top of another. The plates 40 may be provided with an array of sockets for installing optical components individually (see plate 36), but are preferably formed along with the optical components using a means of integrated manufacture. For example, a refractive plate may be provided with an array of optical elements 34 by injection molding in a single manufacturing operation. Such optical elements include, but are not limited to, lenslets, aspherical lenses, diffractive components, cubic phase plates, and apertures. Refractive plates may also be integrally manufactured using photolithographic techniques, embossing, or laser-printing.

The image sensors 20 are preferably distributed in linear arrays 50 aligned in a direction perpendicular to the scan direction "S," as shown in FIG. 8. It may be noted that the objectives 34a in the array as shown in FIG. 8 are staggered in the opposite direction as that shown in FIGS. 2–4, to emphasize that the direction is arbitrary.

Figure 9A:
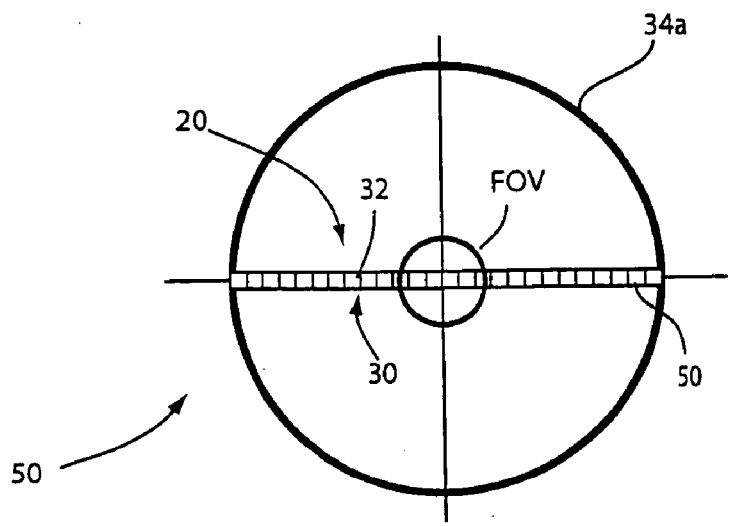
FIG. 9A is a plan view of one of the objectives of the system of FIG. 8 and a corresponding 1-D array of image sensors.
Figure 9B:
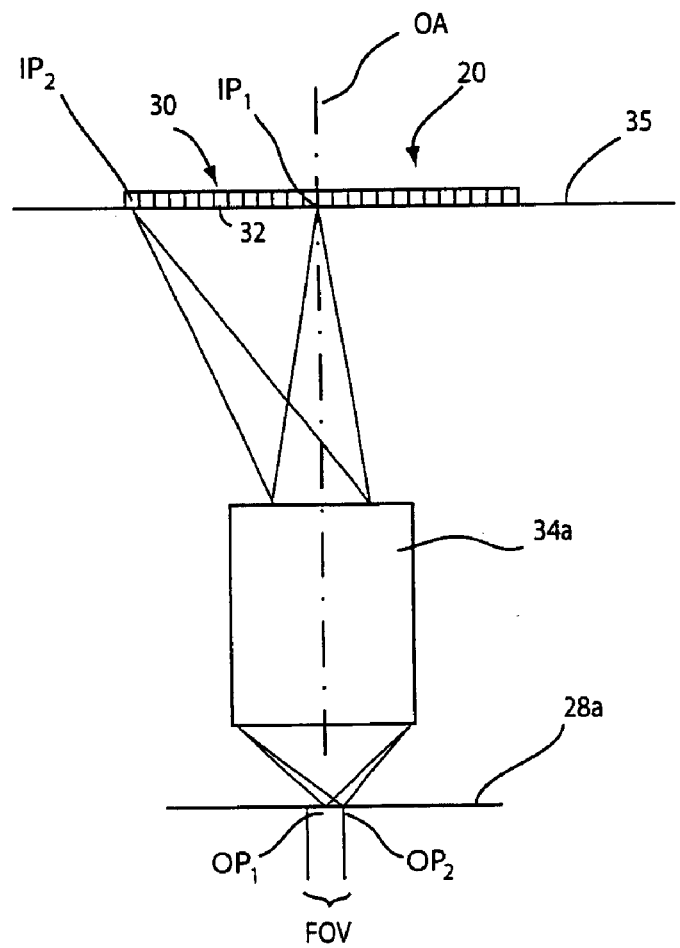
FIG. 9B is a side elevation of the of the objective and image sensors of FIG. 9A, showing an object plane and an image plane.

FIG. 9A shows a detail view of a portion of the linear array 50 of image sensors corresponding to the FOV of a single group of optical elements 34a. The image sensors 20 define individual pixels 30. Each pixel contains a photosensitive sensing area 32. FIG. 9B shows a side elevation of the same portion of the array 50 with respect to an objective 34a and an object plane 28a. The sensing areas of the image sensors 20 are disposed in an image plane 35 for imaging from the object plane 28. For example, the objective 34a images an object point $OP_1$ on the optical axis OA of the objective to an image point $IP_1$ on the image plane 35, and images an object point $OP_2$ that is on the periphery of the FOV of the objective to an image point $IP_2$ on the image plane.

Figure 10A:
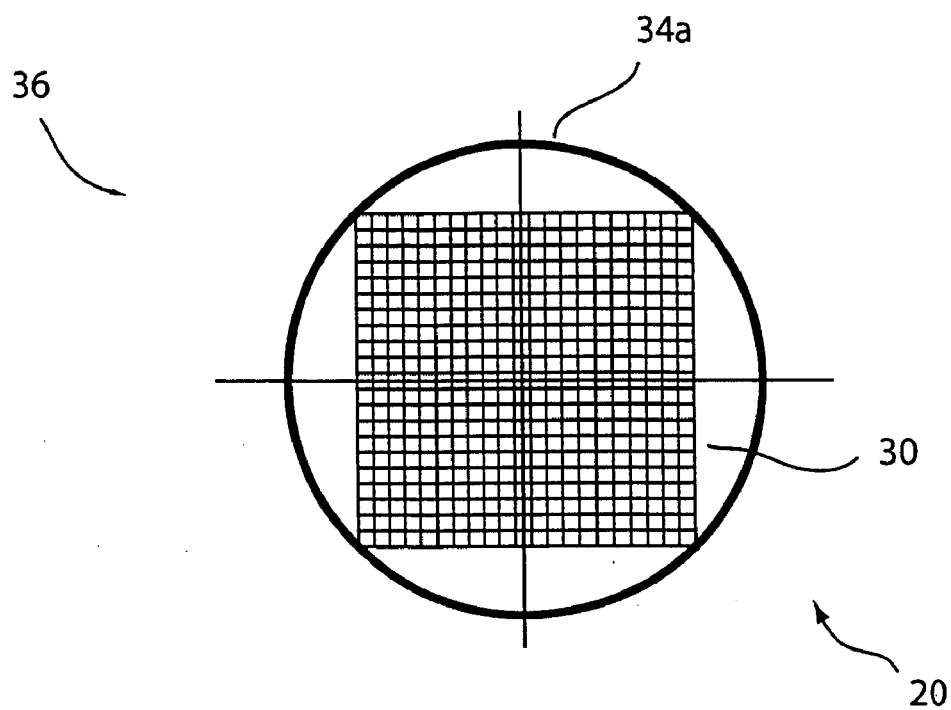
FIG. 10A is a plan view of one of the objectives of the system of FIG. 1 and a corresponding 2-D array of image sensors.

FIG. 10A shows an alternative, two-dimensional, configuration 36 for the image sensors 20, defining a rectangular array of pixels 30. The configuration 36 produces a two-dimensional image at a given instant in time.

Figure 10B:
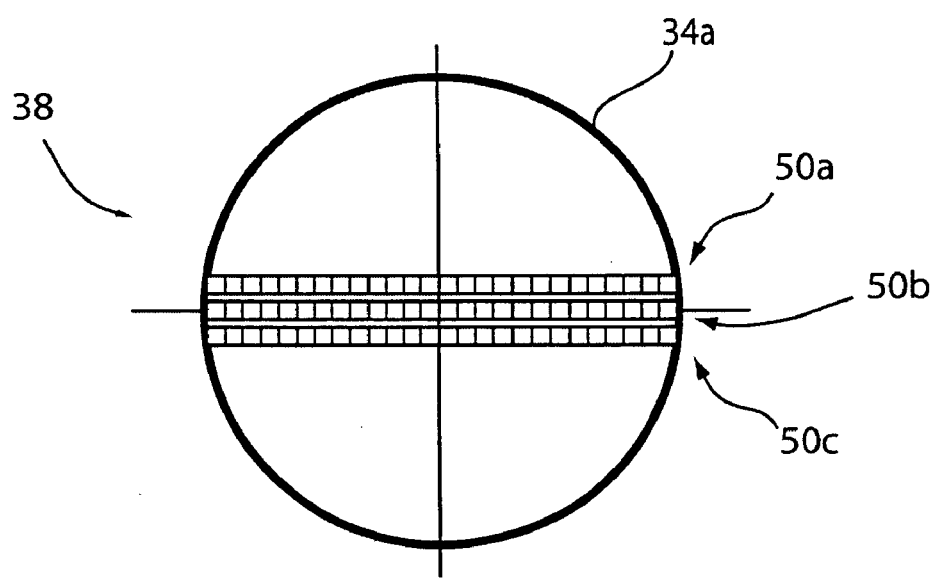
FIG. 10B is a plan view of one of the objectives of the system of FIG. 1 and corresponding multiple 1-D arrays of image sensors.

FIG. 10B shows another alternative, two-dimensional, configuration 38 for the image sensors 20, where multiple linear arrays 50 are employed so as to combine their outputs to produce data corresponding to a single scanning line. For example, the linear arrays 50 may be covered by different spectral filters, so that the linear array 50a may be covered with a filter that transmits red (R) light, the linear array 50b may be covered with a filter that transmits green (G) light, and the linear array 50c may be covered with a filter that transmits blue (B) light. Scanning with the image sensor configuration 38 forms respective images of the same scan line in different colors, and the different color images may be concatenated to produce a composite color image of the scan line ("RGB scan").

Another use of the linear arrays 50 is to introduce redundancy into image sensing. In the event that a pixel in one of the linear arrays 50 fails to operate within acceptable specifications, then the sensing function of that pixel may be accomplished by a corresponding pixel in another array. Given the configuration shown in FIG. 10B, up to two pixels at the same position within each linear array could fail and image sensing could still be completed.

Linear array portions of a two-dimensional array configuration for the image sensors 20 may also be provided with different pixel-to-pixel spacings. For example, the pixel-to-pixel spacing associated with the array 50a of the configuration 38 may be adapted for the transverse magnification associated with the center wavelength of the particular spectral filter used to cover the array 50a.

Linear array portions of a two-dimensional array configuration for the image sensors 20 may also be used to increase the signal-to-noise ratio (SNR) in a technique known as time-delay-and-integration (TDI). As a result of scanning an object row-by-row, charge accumulated in a first row of the image sensors 20 is moved on in columns in synchronicity with the scanning to adjacent rows in sequence and is eventually collected at a last row. The noise variance and the charge increase linearly with the number of rows, and the SNR (ratio of charge to the standard deviation of the noise) is improved relative to a single row of photodetectors by the square root of the number of rows. The effects of fixed pattern noise may also be diminished by averaging over each column.

A linear array of the sensing elements 20 (e.g., FIG. 8), or a two-dimensional array in which linear arrays are employed to combine or concatenate their outputs to produce data corresponding to a single scanning line ("1-D sensing array"), is particularly advantageous for continuous scanning. A two-dimensional configuration used for two-dimensional imaging ("2-D sensing array") is particularly advantageous for use with step-and-image scanning. A 2-D sensing array may also incorporate any number of 1-D sensing array elements.

Either type of sensing array may be adapted to image using different modes of operation or modalities, such as fluorescent microscopy, two-photon microscopy, or multi-photon microscopy. A method of two-photon fluorescence imaging is described in U.S. Pat. No. 5,034,613. A method of multi-photon fluorescence imaging wherein light is delivered via an optical fiber is described in U.S. Pat. No. 5,995,281. Adapted for use in the array microscope 10, the latter method may employ multiple optical fibers corresponding to the multiple objectives 34a of the array.

Figure 11:
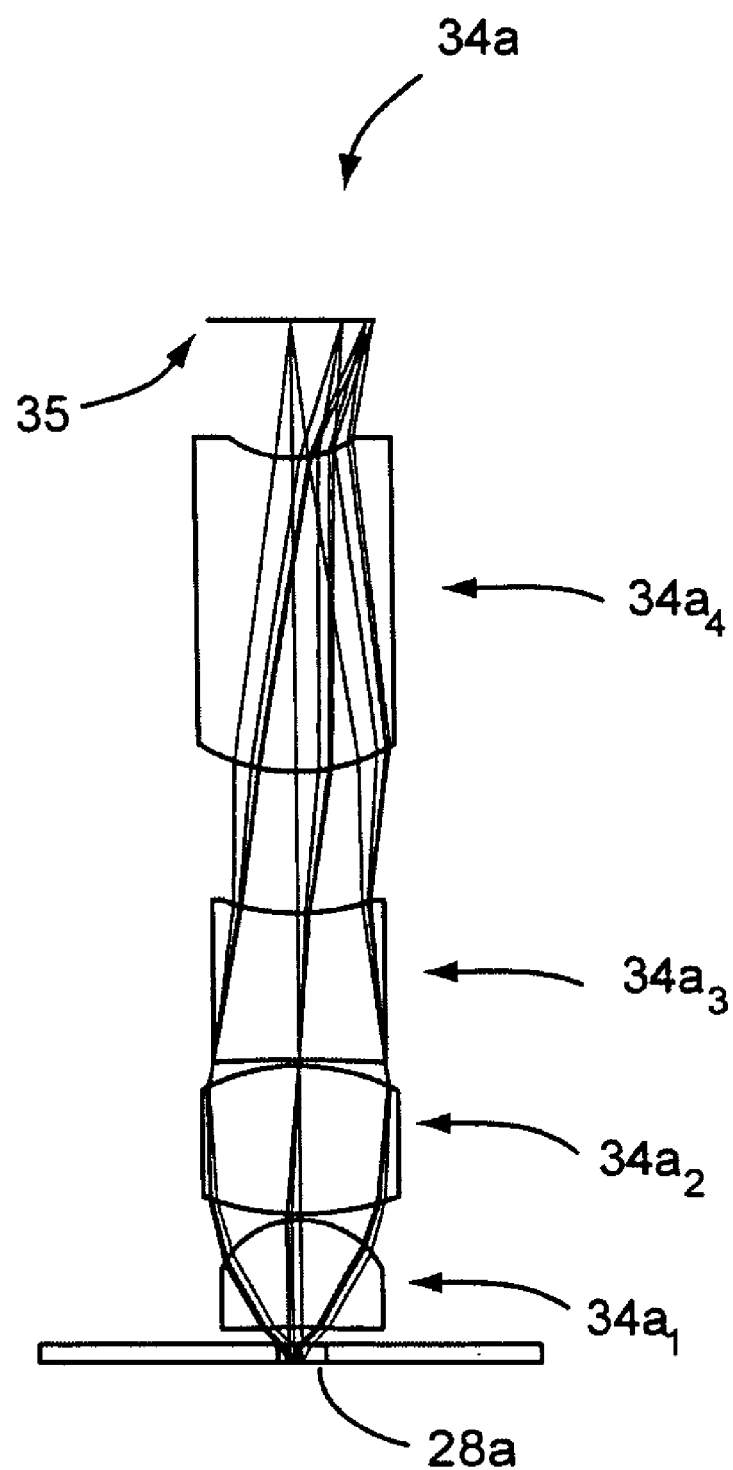
FIG. 11 is a schematic, ray-tracing diagram for an exemplary objective for a microscope array.

For microscope arrays such as the array 10, a high numerical aperture (NA) is desired for the objective 34a to obtain high resolution. FIG. 11 shows a single-axis objective 34a of four optical elements $34a_1$–$34a_4$ designed for a 6× magnification from an object plane 28a to an image plane 35 using a wavelength of 665 nm and having a NA=0.75. The optical design of the objective is shown in Table 1:

TABLE 1

| Surf | Type | Radius | Thickness | Glass | Diameter | Conic |
|---|---|---|---|---|---|---|
| OBJECT | STANDARD | Infinity | 0.15 | BK7 | 0.22 | 0 |
| 1 | STANDARD | Infinity | 0.15 |  | 0.395 | 0 |
| 2 | STANDARD | −4.730 | 0.922 | COC | 0.682 | 0 |
| 3 | STANDARD | −0.588 | 0.050 |  | 1.317 | −0.5850 |
| 4 | STANDARD | 1.977 | 1.273 | COC | 1.573 | −2.414 |
| 5 | STANDARD | −1.387 | 0.050 |  | 1.593 | −2.085 |
| STOP | EVENASPH | −3.255 | 1.249 | POLYSTYR | 1.400 | 0 |
| 7 | STANDARD | 2.157 | 1.196 |  | 1.246 | 6.552 |
| 8 | EVENASPH | 1.191 | 2.687 | COC | 1.600 | 0 |
| 9 | STANDARD | 0.682 | 1.169 |  | 1.037 | −1.837 |
| IMAGE | STANDARD | Infinity | 1.350 |  |  | 0 |

Asphere Coefficients on Surface 6:

r2:0
r4:0.30806182
r6:−0.20536501
r8:0.08932393

Asphere Coefficients on Surface 8 r2:0
r4:−0.14898888
r6:−0.021163623
r8:−0.00757607

It may now be noted for purposes of definition herein that a group 34a of optical elements such as the optical elements $34a_1$–$34a_4$ is a set of optical elements for a single-axis system; however, a multi-axis system includes a plurality of groups like the group 34a, so that a set of optical elements for a multi-axis system is a set of groups.

Figure 12:
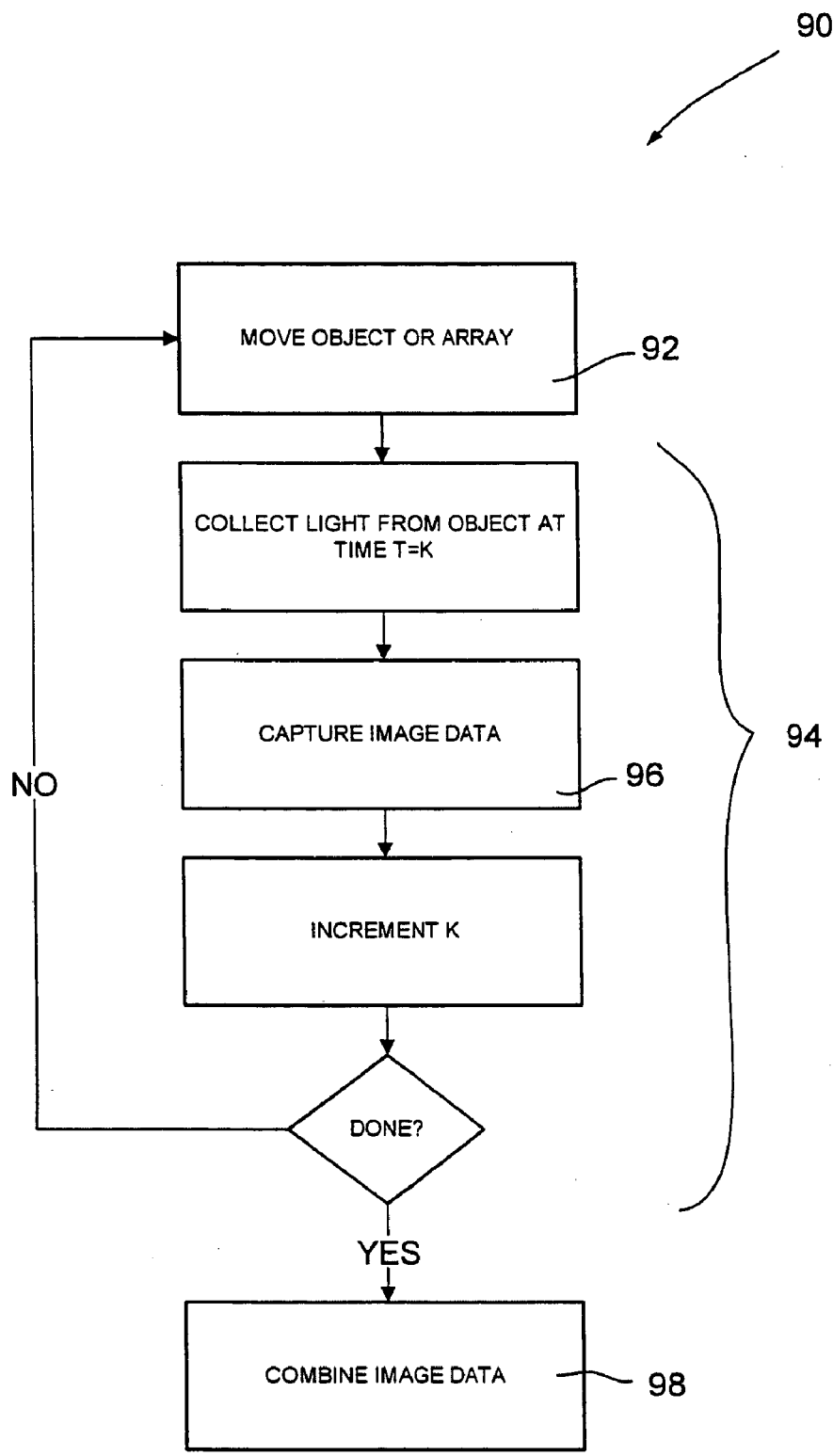
FIG. 12 is a flow chart illustrating an imaging method 90 for imaging an object using the microscope array of FIG. 1.

Turning to FIG. 12, an imaging method 90 for imaging an object using the microscope array 10 is shown. In step 92, the object is moved relative to the microscope array. In step 94, light is collected from the object by optical elements of the array at different times t=k. Each time, at step 96, the image of the object is focused onto corresponding image sensors of the array that capture image data for that time that is representative of respective portions of the object. Finally, in step 98, the image data for the "k" different times is combined to form a composite image.

Specific Preferred Embodiments

Figure 13A:
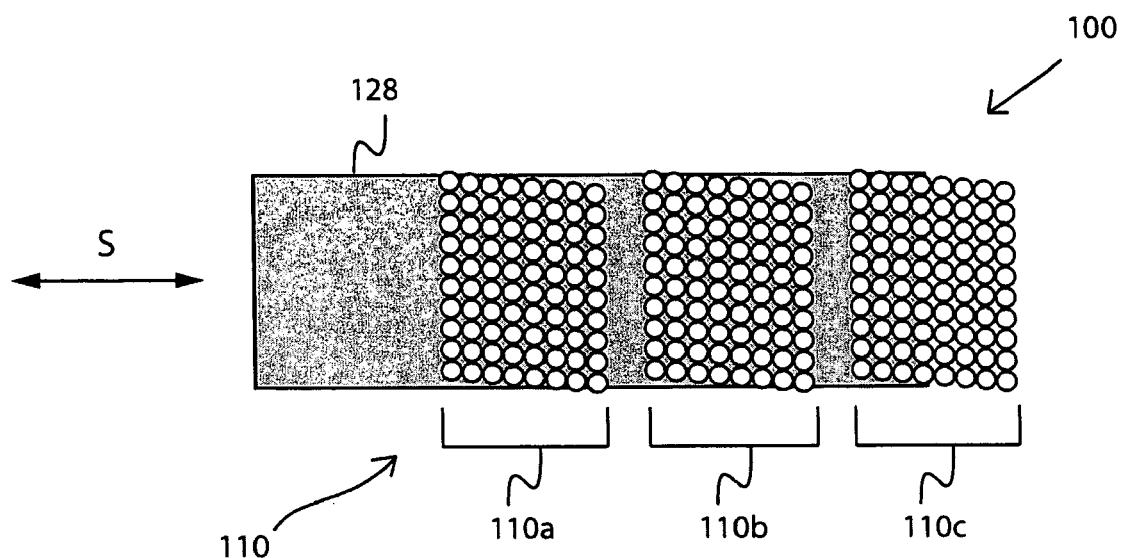
FIG. 13A is a schematic plan view of a first preferred embodiment of a multi-mode scanning imaging system according to the present invention.
Figure 13B:
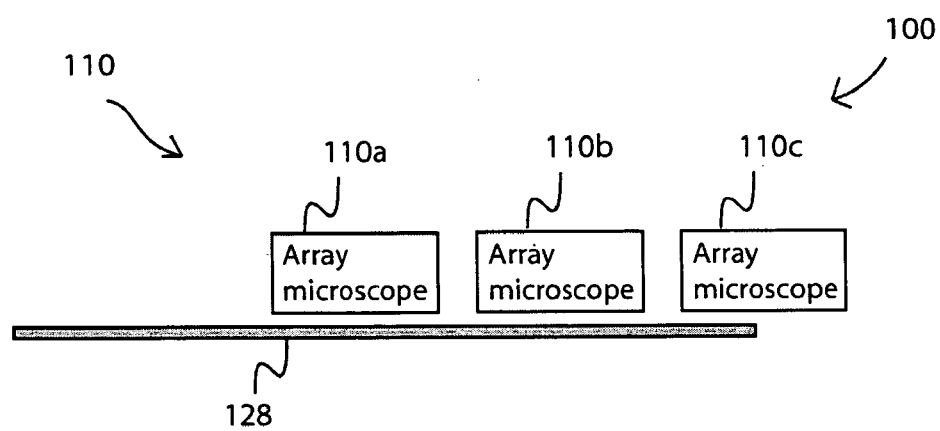
FIG. 13B is a schematic side view of the embodiment of FIG. 13A.

Turning to FIGS. 13A and 13B, an exemplary first preferred embodiment 100 of a multi-mode scanning imaging system according to the present invention is shown. Three array microscopes 110, specifically 110a, 110b, and 110c, are positioned side-by-side with respect to an object to be imaged, which for exemplary purposes may be a microscope slide 128. Each of the three microscopes 110 is positioned to image a different portion of the object 128 at the same time. As the object is scanned by all three microscopes, such as by moving the object relative to the three microscopes in the scan direction "S," the scanning time required to scan the entire object is reduced by approximately a factor of three.

Figure 14A:
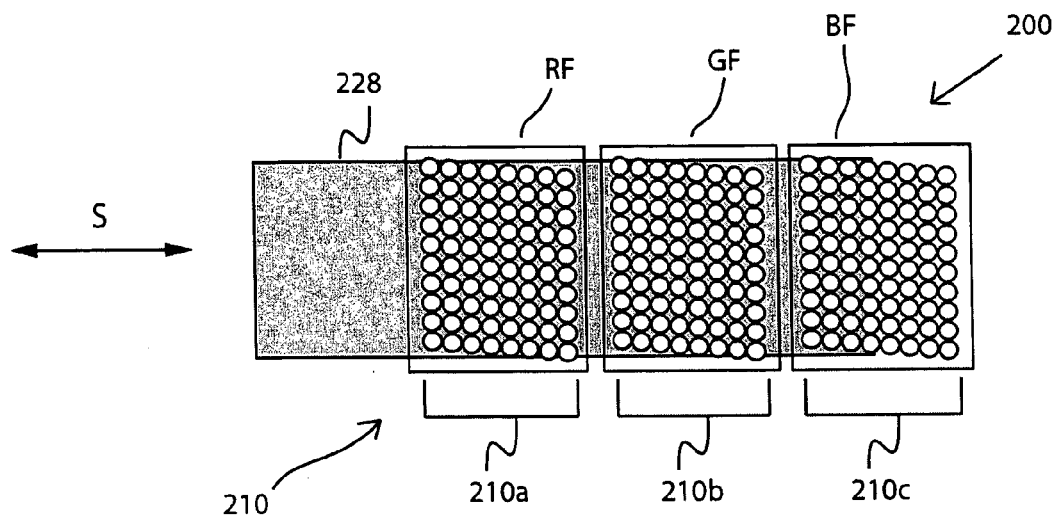
FIG. 14A is a schematic plan view of a second preferred embodiment of a multi-mode scanning imaging system according to the present invention.
Figure 14B:
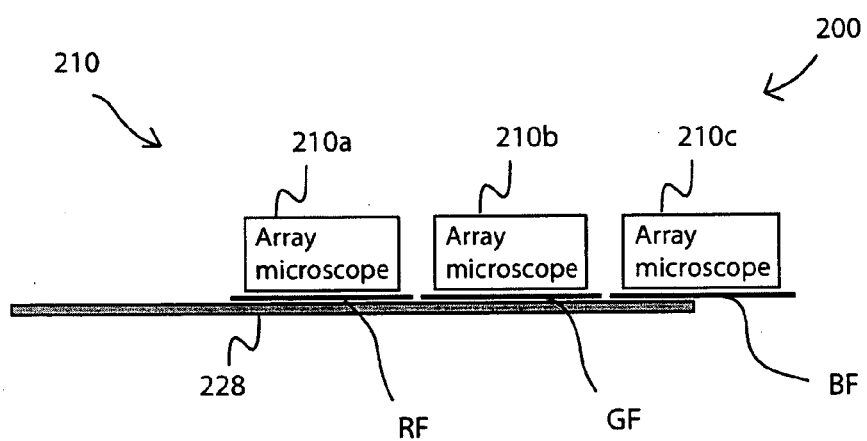
FIG. 14B is a schematic side view of the embodiment of FIG. 14A.

FIGS. 14A and 14B show an exemplary second embodiment 200 of a multi-mode scanning imaging system according to the present invention. Three array microscopes 210, specifically 210a, 210b, and 210c, are positioned side-by-side with respect to an object 228 to be imaged. Each of the three microscopes 210 is positioned to image a different portion of the object at the same time. As the object is scanned by all three microscopes, the microscopes image the object using different modes of operation, or imaging modalities. In this embodiment, the microscope 210a has a red filter "RF" to provide a modality of imaging the object in a red spectral channel, the microscope 210b has a green filter "GF" to image the object in a green spectral channel, and the microscope 210c has a blue filter "BF" for imaging the object in a blue spectral channel.

Image data from the three microscopes are combined to form a composite color image. The process of combining image data for this and other purposes such as those described below is discussed separately further below. It may be noted that the same functionality of imaging in different spectral bands can be provided using identical microscope arrays and altering the spectral properties of illumination corresponding to the particular array.

Figure 15:
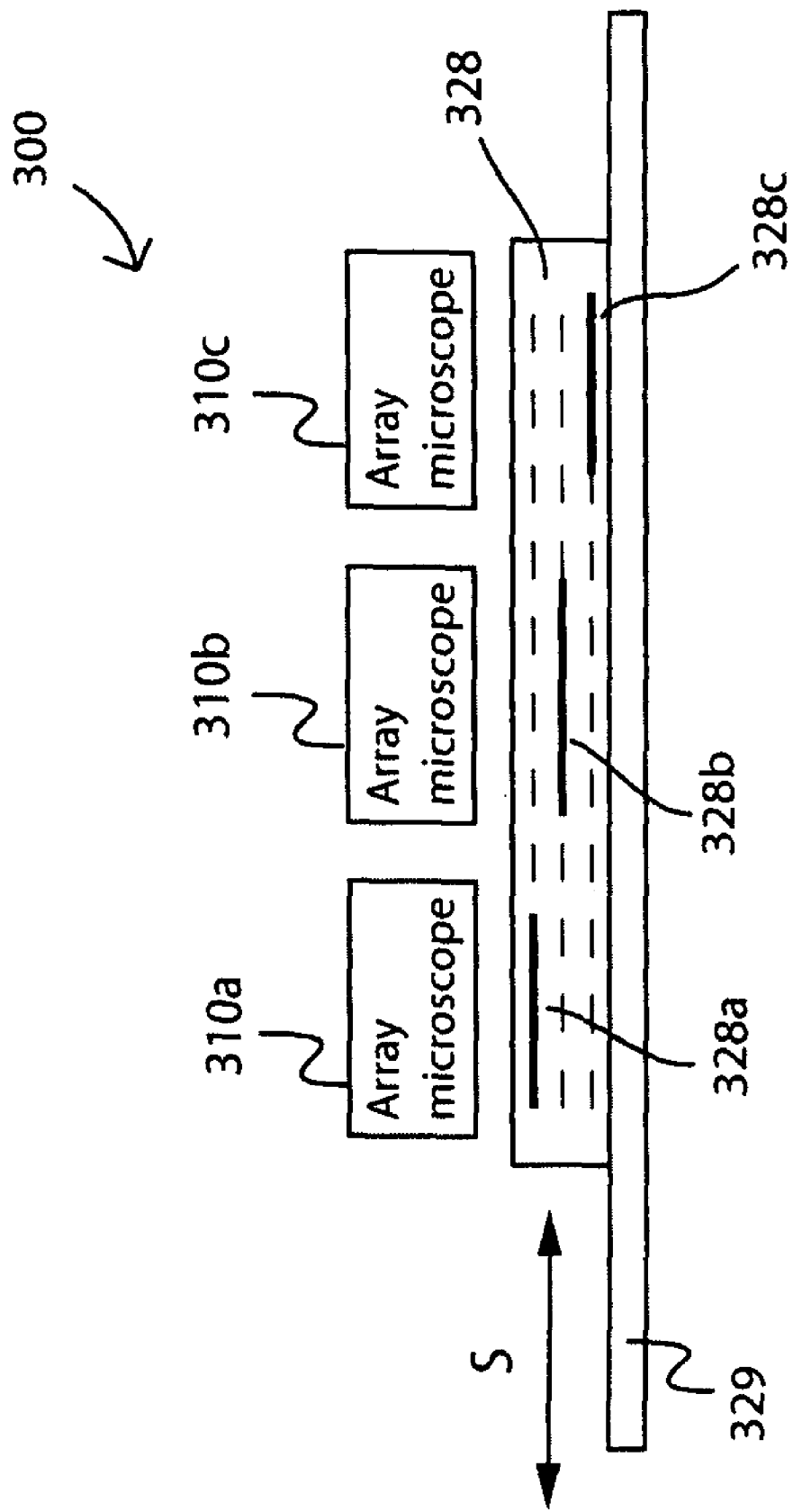
FIG. 15 is a schematic side view of a third preferred embodiment of a multi-mode scanning imaging system according to the present invention.

FIG. 15 shows an exemplary third embodiment 300 of a multi-mode scanning imaging system according to the present invention. Three array microscopes 310, specifically 310a, 310b, and 310c, are positioned side-by-side with respect to an object 328 to be imaged by scanning in the direction "S." The object is, for example, a tissue sample, and is mounted on a microscope slide 329. As for the embodiment 200, each of the three microscopes 310 is adapted to provide a different imaging modality. In this example, the microscope 310a is adapted with a first focus depth in order to place the object plane 328a for the microscope 310a at a first depth within the object, which may be a tissue sample. Similarly, the microscope 310b is adapted with a second focus depth in order to place the object plane 328b for the microscope 310b at a second depth within the object that differs from the first depth, and likewise for the microscope 310c, for three-dimensional imaging. To create a desired focus depth for each microscope, a height adjustment mechanism for each microscope (not shown in FIG. 15, but see FIG. 1) is provided to translate the object in the vertical direction "V" for focusing the microscope on the object. A pitch/roll adjustment mechanism is also preferably provided to adjust the pitch "P" and roll "R" of the object, to accommodate any tip or tilt of the object.

Figure 16:
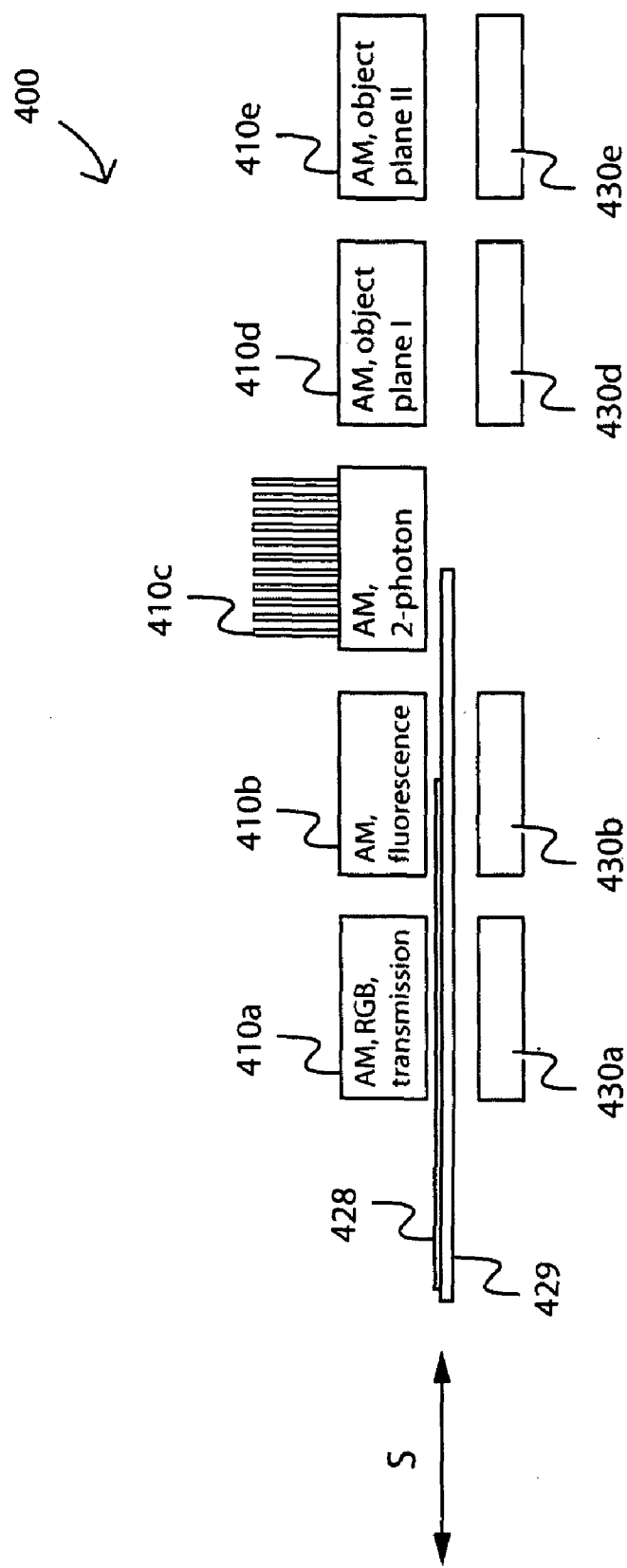
FIG. 16 is a schematic side view of a fourth preferred embodiment of a multi-mode scanning imaging system according to the present invention.

Turning to FIG. 16, a fourth embodiment 400 of a multi-mode scanning imaging system according to the present invention is shown. Five array microscopes 410, specifically 410a, 410b, 410c, 410d, and 410e, provide diverse imaging modalities for imaging a biological specimen 428 located on a microscope slide 429. The slide is advanced in the scan direction "S" so that the specimen passes the microscopes 410 in turn. In this example, the microscope 410a provides an RGB scan of the specimen using white light produced by a trans-illumination system 430a; the microscope 410b is adapted to image fluorescence emitted by the specimen in response to light produced by a trans-illumination system 430b; the microscope array 410c is adapted to perform a 2-photon fluorescence scan of the specimen using femtosecond pulses of light delivered through an illumination system comprising an array of optical fibers 430c.

After passing the microscopes 410a, 410b, and 410c, the specimen passes the microscope 410d, which is focused on a first object plane 404d that is positioned inside or within the preparation. Finally, the specimen passes the microscope 410e, which is focused on a second object plane 404e that is also inside the specimen but at a different depth than the first object plane 404d. Respective trans-illumination systems 430d and 430e are provided to trans-illuminate the specimen for the microscopes 410d and 410e. The illumination systems and the image sensors of the microscopes are all tailored for the particular imaging modalities of the microscopes.

Figure 17:
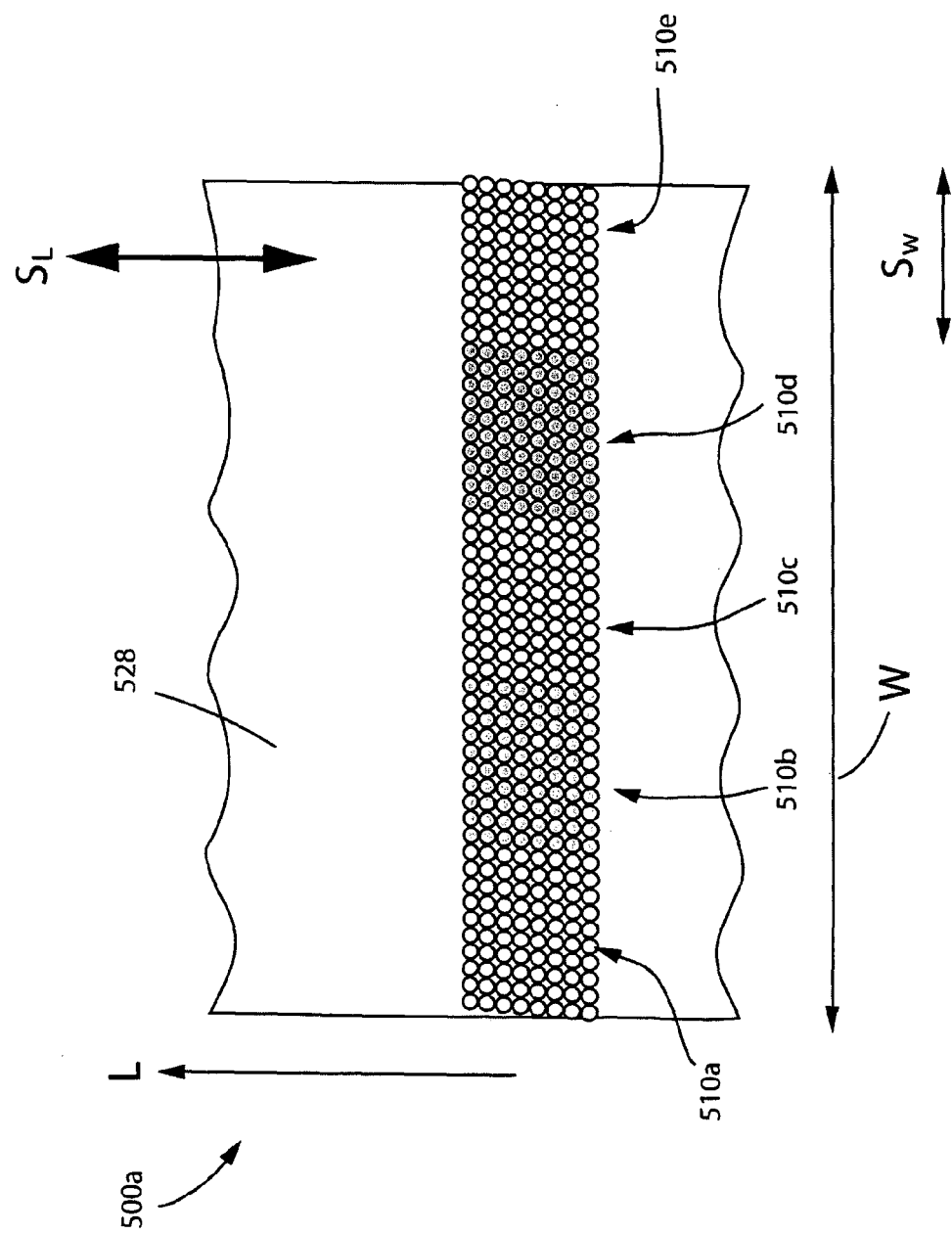
FIG. 17 is a schematic view of a fifth preferred embodiment of a multi-mode scanning imaging system according to the present invention.

Turning to FIG. 17, a fifth embodiment 500a of a multi-mode scanning imaging system according to the present invention is shown. Five array microscopes 510, specifically 510a–510e, are used to laterally span the width "W" of a relatively wide object 528 for scanning the object in a longitudinal scan direction "$S_L$" oriented along the direction of the length "L" of the object. For this purpose, the array microscopes 510 are preferably placed in a laterally abutting relationship, so that the microscopes together can be used to scan the object in a single pass. The microscopes 510 of the fifth embodiment can also be used as in the embodiment 200 for scanning a reduced-length portion of the object in a single pass in a transverse scan direction "$S_W$," or they can be used for scanning the entire object using multiple passes in the transverse scan direction.

Figure 18:
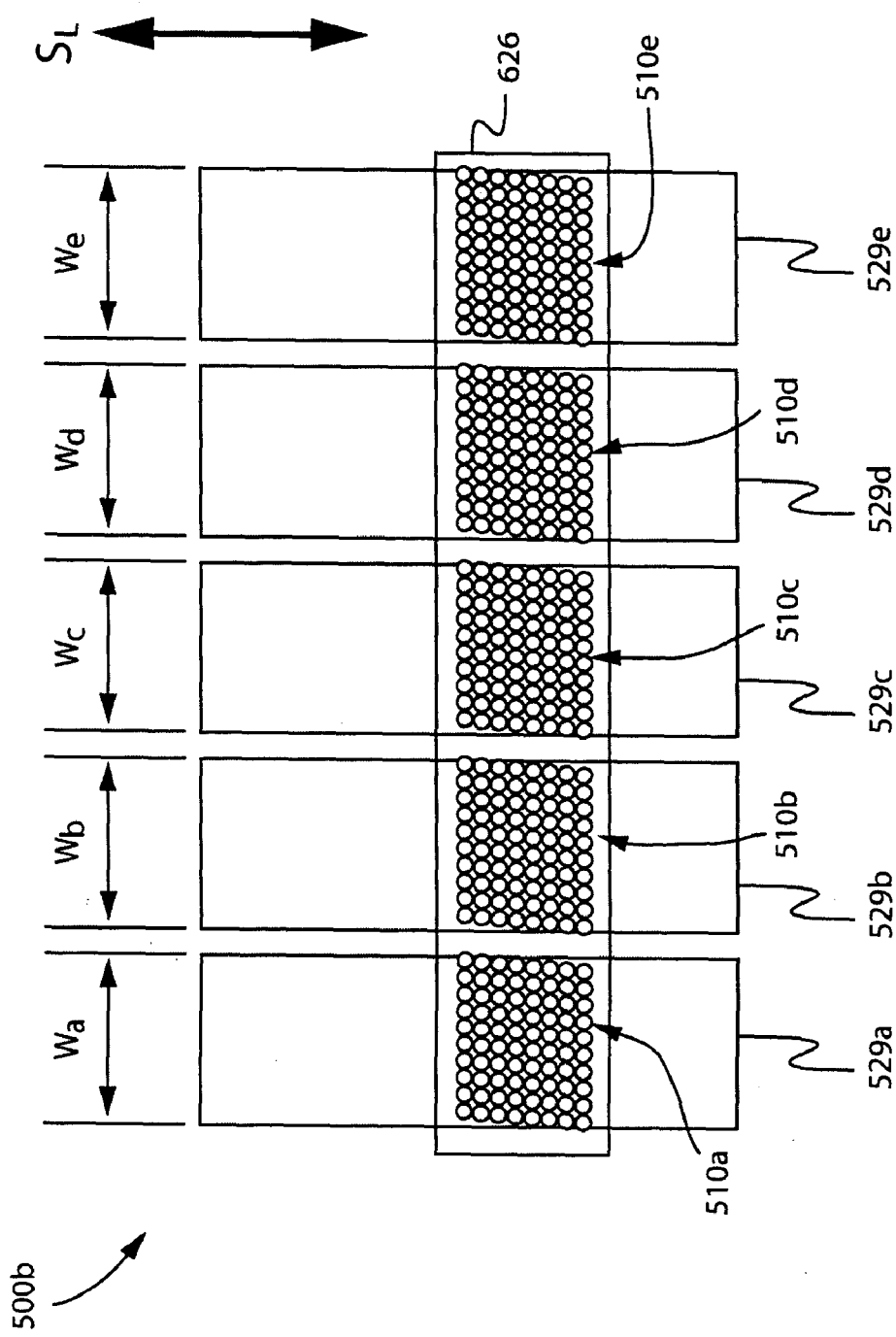
FIG. 18 is a schematic view of an alternative configuration of the fifth embodiment of FIG. 17.

FIG. 18 shows another alternative configuration of the fifth embodiment 500b where the five microscopes are used to scan five different objects 529, specifically 529a–529e, in a longitudinal scan direction "$S_L$." The objects have respective widths "W", specifically "$W_a$"–"$W_e$," and are spaced apart, so that the microscopes 510 are not in laterally abutting relationship with respect to the lateral dimensions "W" of the objects. The microscopes 510 are supported in a tray 626.

Figure 19:
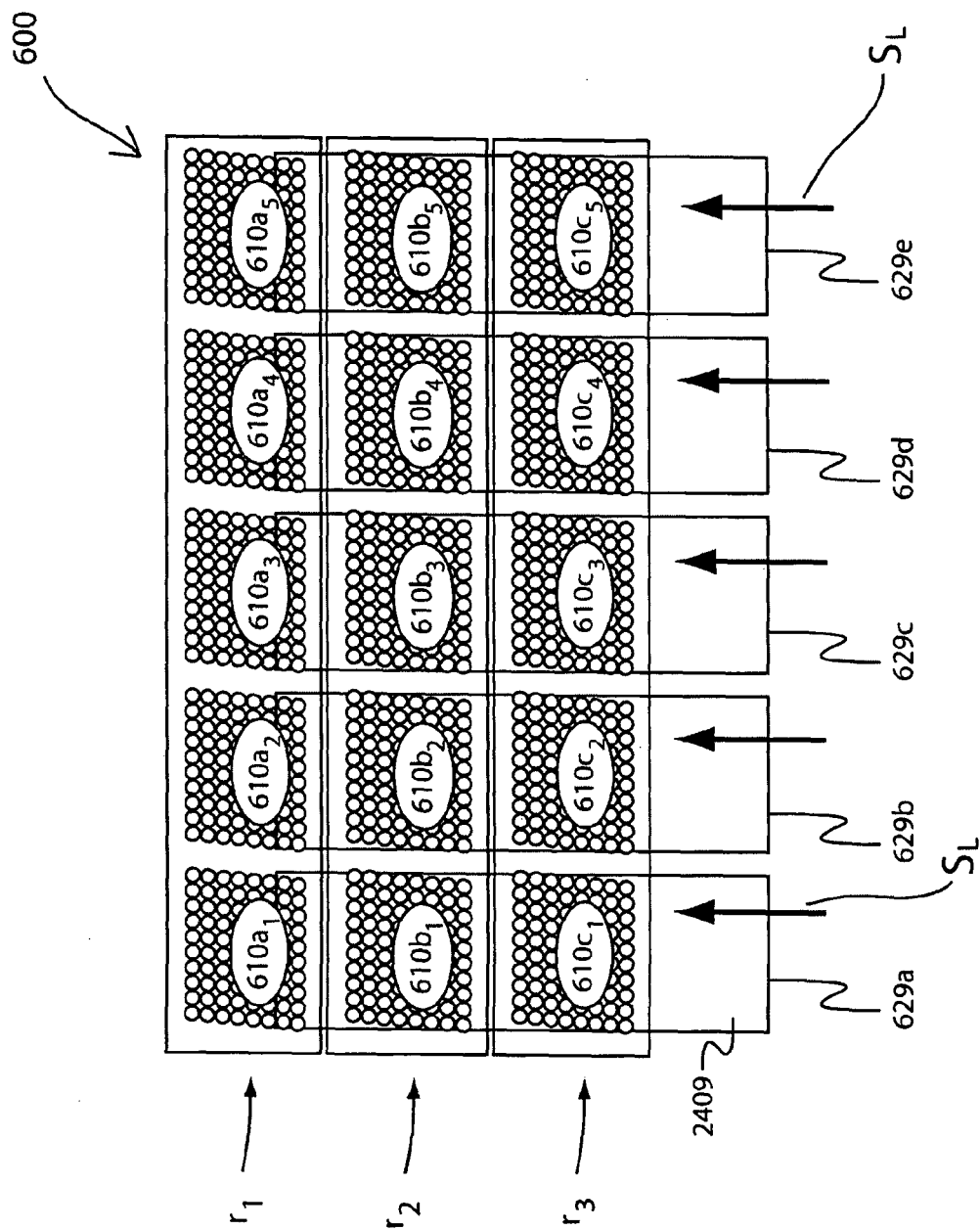
FIG. 19 is a schematic view of a sixth preferred embodiment of a multi-mode scanning imaging system according to the present invention.

FIG. 19 shows a sixth embodiment 600 of a multi-mode scanning imaging system according to the present invention. The embodiment 600 provides, in this example, a two-dimensional array of microscope arrays. An array of microscope arrays is itself a microscope array according to the principles of the present invention, where individual microscope arrays collectively form a microscope array that may be considered a super-array. In the exemplary embodiment 600, there are 15 array microscopes arranged in 3 rows and 5 columns, i.e., microscopes $610a_1$, $610a_2$, ... $610a_5$ in a first row "$r_1$" of the super-array, microscopes $610b_1$, $610b_2$, ... $610b_5$, in a second row "$r_2$" of the super-array, and microscopes $610c_1$, $610c_2$, ... $610c_5$, in a third row "$r_3$" of the super-array.

The super-array of this example can be used to scan 5 different objects 628, e.g., 5 microscope slides 628a–628e, in respective longitudinal scan directions "$S_L$" that correspond to the columns of the super-array. The different rows of the super-array may then correspond to different modalities for the array microscopes, such as any of the modalities described above.

Figure 20:
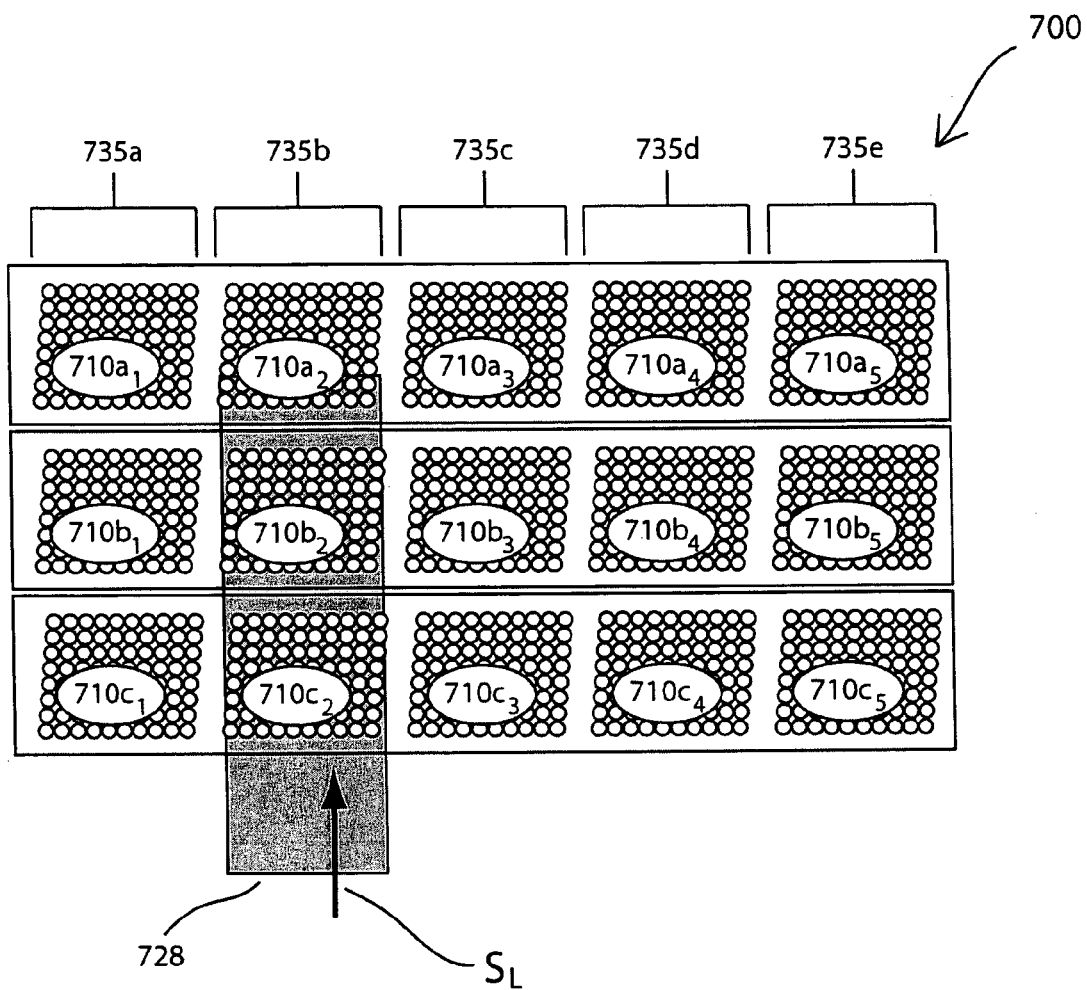
FIG. 20 is a schematic view of a seventh preferred embodiment of a multi-mode scanning imaging system according to the present invention.

FIG. 20 shows a seventh embodiment 700 of a multimode scanning imaging system according to the present invention. Like the embodiment 600, the embodiment 700 provides a two-dimensional array of microscope arrays. In this example, a number of different combinations of imaging modalities are provided for selection by a user, for imaging a single object 728, which is shown as a microscope slide, in a scan direction "$S_L$." In this example, the imaging modalities for 15 microscopes 710, specifically $710a_1$–$710c_5$, are provided in 5 "tracks" 735, specifically 735a–735e, that represent unique combinations of modalities. As for any of the embodiments, these modalities may include, but are not limited to, confocal microscopy, extended depth of field microscopy, fluorescence microscopy (spectral bands 1–5), multispectral microscopy, multispectral fluorescence microscopy, phase-contrast microscopy, reflectance microscopy, and bright field absorption microscopy; the modalities also include varying object planes and illumination type such as described above in connection with the fourth embodiment 400; the modalities further include aggregating microscopes to increase scanning speed such as described above in connection with the first embodiment 100.

Figure 21:
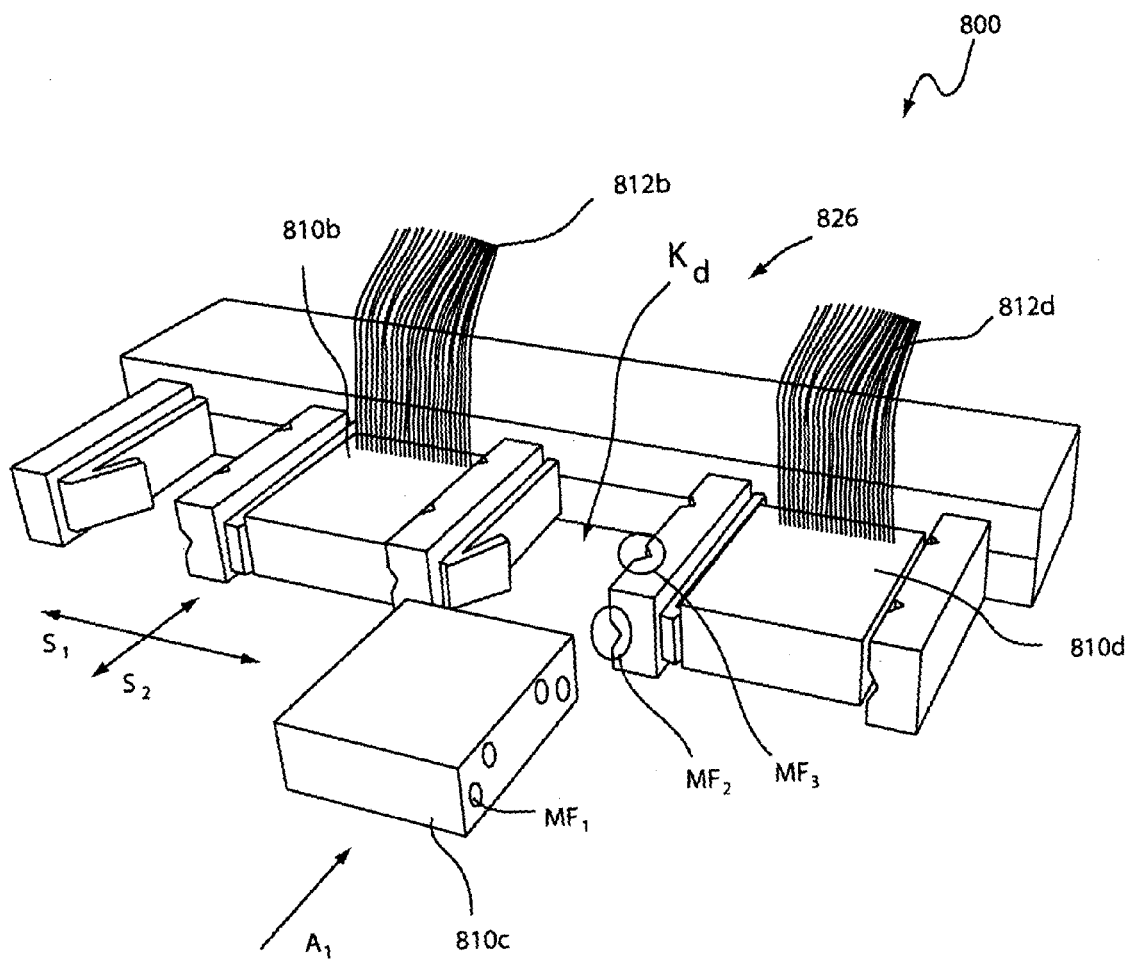
FIG. 21 is a pictorial view of a preferred modular implementation of a multi-mode scanning imaging system according to the present invention.

FIG. 21 illustrates a preferred modular implementation of a multi-mode scanning imaging system 800 according to the present invention. Three microscope array modules 810, specifically 810b, 810c, and 810d, are shown. The modules may be selected from a larger set of modules that makes available to a user of the system various choices from among diverse imaging modalities.

A module receiving tray 826 is provided to physically receive and mount the modules for use in sockets "K" adapted to fit the respective modules. There are typically more sockets K than the number of modules used in a given application to allow for expansion. The tray is shown receiving the module 810c in the socket "Kd" in the direction of the arrow "$A_1$." Scanning may be performed in any lateral direction with respect to the tray, i.e., any linear combination of the scan directions "$S_1$" and "$S_2$."

The modules are of a standardized size and shape so that the modules can be mixed and matched as desired for a given application. This can be done either by the end-user or by the manufacturer.

The modules and the tray include electrical or optical interconnection pairs 812b, 812c (not shown), 812d, etc., where each pair is adapted with appropriate connectors (not shown) for repeated interconnection and disconnection. Image data captured by the modules is transmitted over the interconnection pairs to a computer such as the aforedescribed computer 26. Control signals for controlling the modules may also be passed between the modules and the computer over the interconnection pairs. For example, modules may be provided with actuators for adjusting focus, so that control and feedback signals (where desired) for controlling the actuators are passed back and forth between the computer and the modules.

Figure 22:
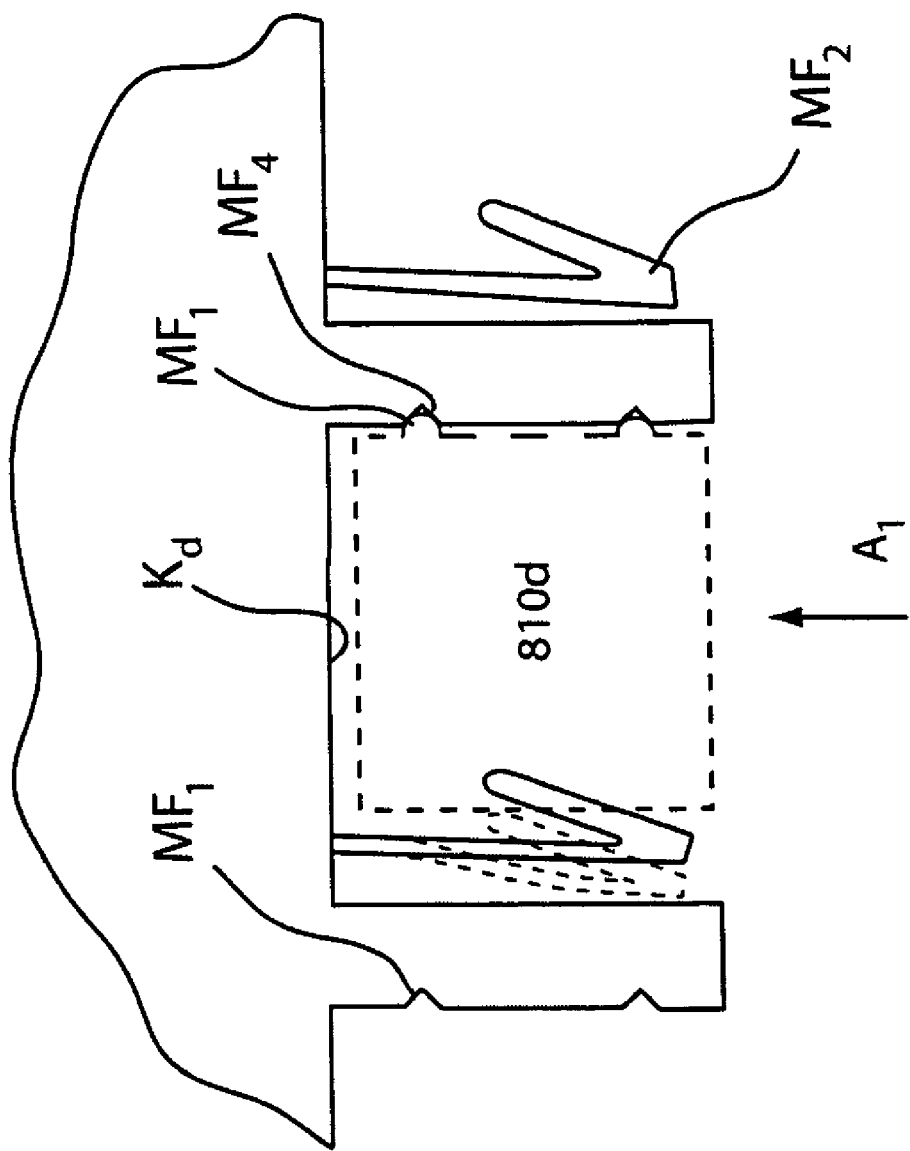
FIG. 22 is a pictorial view of a means for receiving and mounting modules as shown in FIG. 21 according to the present invention.

The modules 810 and the tray 826 are provided with complementary mating features "MF," such as indicated as $MF_1$–$MF_3$ in FIG. 21, which provide for releasable and repeatable installation of the modules into the tray. For example, referring to FIG. 22, modules may be provided with protrusions that fit or snap into complementarily shaped cavities in the tray, and one or more spring-members such as $MF_2$ (shown in FIG. 21 in a relaxed position in dotted line and in a biasing position resulting from insertion of the module in solid line) may be used to bias the module to maintain registration of the protrusions and cavities. Protrusions such as $MF_1$ and corresponding grooved cavities such as $MF_3$ (visible in FIG. 21) may be used for guiding the modules into the sockets, and the protrusions may stop in deeper localized cavities such as $MF_4$ (FIG. 22) to finally register the module to the tray. Kinematic mounting means is preferred.

Retaining structures for holding the modules in accurate position may be fabricated with the tray 826 by using processes such as LIGA, which is an acronym derived from the German words for lithography, electroplating, and molding. The fabrication of micro-mechanical devices or structures using this technology is described in, for example, U.S. Pat. No. 6,332,568, U.S. Pat. No. 6,517,665, U.S. Pat. No. 5,917,269, U.S. Pat. No. 5,327,033, and U.S. Pat. No. 5,206,983. Using LIGA manufacturing processes, structures or devices may be lithographically formed, or a lithographically formed negative or complementary part may be produced that is used to form a final part by electroforming, i.e., filling voids in the negative or complementary part with electrodeposited metal. Parts can be formed into multi-layer structures by stacking layers and diffusion bonding the layers. Kinematic mounting means may also be employed and fabricated using the LIGA process.

Although very high mounting registration accuracy can be provided using known means, it is also often not critical that the modules be held in perfect registration with one another, especially when each module is capable of imaging the entire object and images from the different modules can be co-registered after acquisition.

Each of the modules 810 may be self-contained, complete imaging systems that include an optical system for imaging, a sensing system for sensing, and an illumination system for providing illumination, where all of these systems are specially adapted for the particular imaging modality of the module. However, further "mix-and-match" flexibility may be provided by modules that are limited with respect to one or more of these systems. For example, an optical system may be provided in one module, a sensing system may be provided in another module, and an illumination system may be provided in yet another module. Then, sets of imaging modules would be made available along with sets of sensing modules and sets of illumination modules to provide a user of the system a very large number of possible combinations of systems.

Figure 23:
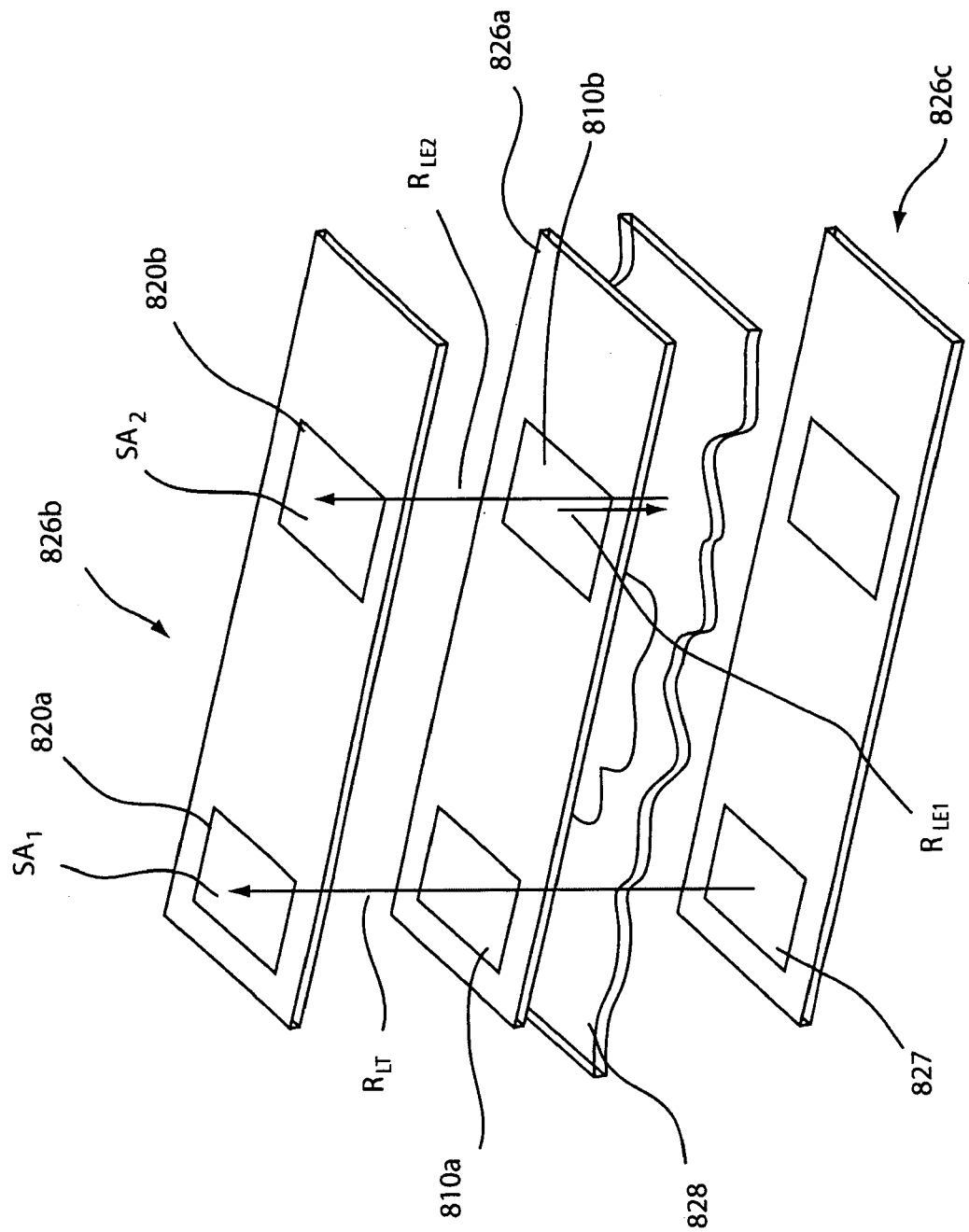
FIG. 23 is a schematic pictorial view of multiple instances of the means of FIG. 22, for receiving and mounting imaging, illumination, and sensing modules according to the present invention.

Turning to FIG. 23, each function in the above example, i.e., optical, sensing, and illumination, has associated therewith a module receiving tray like the tray 826. Particularly, a first tray 826a is provided to receive and mount one or more imaging modules with respect to an object to be imaged 828. A second tray 826b is provided to mount corresponding sensing modules.

A third tray 826c may be provided to receive and mount any corresponding trans-illumination modules. Shown in schematic form is a ray of light "$R_{LT}$" produced by a trans-illumination module 827 passing through the object 828 and imaged through an imaging module 810a onto a sensing area "$SA_1$" of a sensing module 820a.

To provide epi-illumination, the imaging modules incorporate epi-illumination means adapted for the particular mode of imaging. Therefore, a range of imaging modules including a corresponding range of epi-illumination means are preferably provided. Shown in schematic form is a ray of light "$R_{LE1}$" produced by an epi-illumination means incident the object 828. A reflected ray of light "$R_{LE2}$" from the object is imaged by the imaging module onto a sensing area "$SA_2$" of a sensing module 820b.

Figure 24:
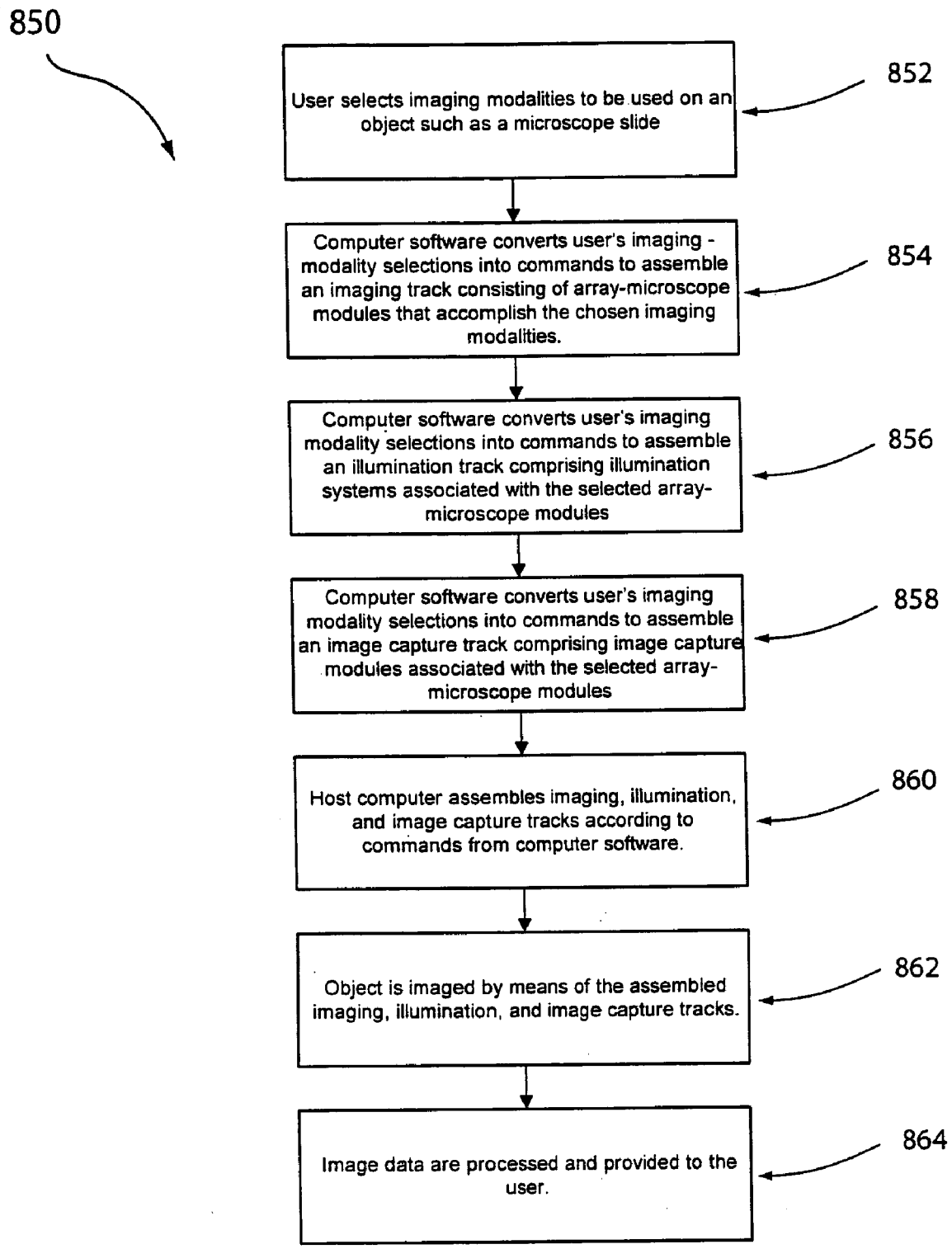
FIG. 24 is a flow-chart illustrating a preferred method for a user interface according to the present invention.

The aforementioned computer is preferably adapted to provide a convenient user interface for the imaging system 800. FIG. 24 is a flow-chart illustrating a preferred method 850 of this user interface to provide for mixing and matching modules that are limited to one of the optical, sensing, and illumination functions.

In a first step 852 of the method, the user selects one or more imaging modalities for use in imaging an object from among a menu of choices. In a first tier of the menu, the user may select from among a choice of imaging modalities. Examples of imaging modalities have been given above in the discussion of embodiments.

For each choice of imaging modality, a second tier of the menu may display choices of appropriate optical parameters for that modality. For example, for bright field microscopy, the second tier of the menu may display parameters that include the desired numerical aperture, spectral range, and depth at which the object plane is to be positioned.

For the selected modality and optical parameters, subsequent tiers of the menu may display remaining options for the sensing system, and thereafter options for the illumination system. Examples of sensing systems options for particular image modules are the number and size of the pixels, spectral sensitivity, and configuration, e.g., 1-D, 2-D, or combination. Examples of illumination system options include optical fibers, LED's of diverse emission spectra, and structured illumination sources. The tiers of choices may be presented to the user in any order that is logical or desired.

In a second step 854 of the method, the computer instructs the user to assemble an imaging track comprising the selected imaging modules or, alternatively, would instruct a mechanical device or robot to perform this function.

In a third step 856 of the method, the computer instructs the user to assemble an illumination track comprising the selected illumination modules or, alternatively, would instruct a mechanical device or robot to perform this function.

In a fourth step 858 of the method, the computer instructs the user to assemble a sensing or image-capture track comprising the selected sensing modules or, alternatively, would instruct a mechanical device or robot to perform this function.

In a fifth step 860 of the method, the modules used to illuminate the object, image the object, and capture image data representative of respective portions of the object are assembled.

In a sixth step 862 of the method, the modules are used to illuminate the object, image the object, and capture image data representative of respective portions of the object.

Finally, in a seventh step 864 of the method, data from step 862 is processed. Particularly, image data obtained by use of any of the foregoing methods and apparatus is preferably combined where possible to extend the information content of the data as well as to provide for displaying the data in a manner that is most revealing of the phenomenon under observation. As one example, data may be organized and displayed in the form of two or three dimensional graphics; as another example, images produced by use of one modality may be overlaid on images of the same object, or of the same portion of the object, produced by use of another modality. Multi-mode scanning imaging systems according to the present invention are especially advantageous in providing such capabilities to enhance the quality of data and to simplify and accelerate data analysis.

Image data are combined in two general circumstances. First, image data corresponding to different sets of optical elements that image respective different portions of an object are combined by concatenating the image data. Second, image data corresponding to different sets of optical elements that image the same portions of an object are combined by correlating or overlaying the image data. Either type of combination may be implemented by the computer 26 described above.

The method of combination depends on the modes of operation of the imaging system. For example, where as in the embodiments 200 and 500 a plurality of microscope arrays are used in a mode of operation that scans different portions of the same object, the data are concatenated to join the data contiguously. On the other hand, where as in the embodiment 600 the arrays are used in a mode of operation wherein each array scans a different object, the data are not necessarily combined but may be concatenated if desired.

The embodiment 200 provides an example of a mode of operation in which image data are correlated. Particularly, the different R, G, and B images are overlaid to produce a composite color image. In the embodiment 300, the image data are also overlaid in such manner as to produce a 3-D composite image. In the embodiment 400, image data from the microscope 410a is correlated to combine R, G and B images, and the composite image is further correlated with the fluorescence image data from the microscope 410b and the 2-photon fluorescence data from the microscope 410c. In addition, all of this image data is overlaid with image data from the respective object planes of the microscopes 410d and 410e in such manner as to produce a 3-D composite image. In all of these examples, the computer 26 functions as a mode implementation system for combining the image data according to one or more desired modes of operation of the imaging system.

In addition, each array may have independent means of articulation to find the best focus position with respect to the object to be scanned. Such a system may provide but is not limited to adjusting height, pitch, and roll. The means of adjustments can be provided by motors, MEMS (Micro-Electrical-Mechanical Systems) actuators, piezoelectric transducers or stacks, or any other devices with suitable accuracy and range of motion.

Concatenating data from multiple arrays may be done according to one of two basic methods. Preferably, precise mechanical positioning between modules is provided, such as by using the system 800 described above. Then, a one-time calibration step can be performed in a manner analogous to the method by which the microscope array 10 is calibrated for the spacings between the objectives 34a. An object is imaged with a multi-module system and actual imaging overlap, i.e., redundant data, between the modules is determined by comparison of the images. The geometric relationship between the objectives of a given set or module is known, so the fields of view, or portions thereof, within the modules that are responsible for producing the overlapping data can be identified, and these data can thereafter be disregarded. This method can also be used with re-calibrations where necessary.

Where precise mechanical positioning is not or cannot be provided, a standard means of abutting images from the different modules according to a mathematical determination of "best fit," often referred to as "stitching," may be used. One example of such a mathematical determination is finding a maximum cross-correlation of the overlapping regions of images.

Correlating data from multiple arrays or multiple sets of optical elements typically requires that a one-time calibration procedure establishing the geometric relationship between the systems, e.g., the lateral spacings between the systems and their relative orientations, be performed. An exemplary calibration procedure includes acquiring, with each of the systems, an image of a prepared target for which the position of the target and the orientation of the target can be uniquely and accurately identified. For example, for imaging using the two modalities of bright field imaging of trans-illumination and epi-illumination, an example of such a target is a flat glass slide with a fiducial pattern of accurately positioned crosses on a rectangular grid and a linear ruler with an accurate scale.

Such a target can be produced using conventional lithography with accuracy exceeding 0.1 µm. The target is scanned sequentially by the different systems. The resulting images are then matched using, e.g., cross-correlation and their lateral geometric relationships established with sub-pixel accuracy.

Where one or more modalities are not compatible, a specialized target is created. A large number of modalities are possible in microscopy, and it is not possible to create a general purpose target. However, a target can prepared having features that can be detected using at least two different modalities; therefore, geometric relationships between systems employing any number of modalities can be determined using an appropriate combination of such targets. For example, for combining images from a first imaging module using a fluorescent imaging modality and a second imaging module using a bright field imaging modality, a first target employing fluorescent quantum dots or other localized structures of suitable composition can be provided for registering the images from the two modules. However, it may not be possible to prepare the first target with features that can be seen in both the first and second modalities as well as a third modality used by a third imaging module. Therefore, to register the images from the first two modules with the third module, another target can be prepared having features that are visible in just the first and third modalities, or the second and third modalities. For example, registering the third module to the first module also registers the third module to the second module where the geometric relationship between the first and second modules has already been established such as by use of the first target.

The microscopes and modules described above comprise microscope arrays, and it is believed that this configuration provides outstanding advantages in multi-mode scanning image systems over other multi-axis imaging systems, and over single-axis imaging systems. However, it is reiterated that microscopes and modules according to the present invention are not limited to microscope arrays, and other multi-axis systems as well as single-axis systems may be used without departing from the principles of the invention.

It is to be recognized that, while particular multi-mode scanning imaging systems have been shown and described as preferred, other configurations and methods may be employed without departing from the principles of the invention.

The terms and expressions that have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow:

The invention claimed is:

1. A multi-mode scanning imaging system for imaging an object, comprising:
   a plurality of discrete two-dimensional microscope arrays for scanning along a single linear motion of scan, each microscope array being configured to image the object with a plurality of optical elements arranged in rows, said rows being staggered with respect to said motion of scan such that each of the optical elements images a respective continuous strip of the object along the motion of scan, said continuous strip being substantially free of overlap with continuous strips imaged by all other optical elements of said plurality of optical elements;
   a scanning mechanism for producing said scan as a result of a relative movement between the microscope arrays and the object along said single linear motion of scan;
   image sensors corresponding to the microscope arrays for capturing image data representative of respective images of the object imaged thereby; and
   a mode implementation system for combining the image data captured by said image sensors during said scan of the scanning mechanism;
   wherein said scan is implemented through said single linear motion of scan across the object; said microscope arrays are configured to operate according to different modes of operation of the imaging system and produce correspondingly different images of the object during said scan of the scanning mechanism; and said microscope arrays sequentially scan and image a same area of the object during said scan of the scanning mechanism.

2. The imaging system of claim 1, wherein said image data corresponding to said microscope arrays are registered with one another by said mode implementation system.

3. The imaging system of claim 2, wherein said image data corresponding to said microscope arrays represent respectively different colors.

4. The imaging system of claim 2, wherein said image data corresponding to said microscope arrays represent respectively different object planes.

5. The imaging system of claim 1, further comprising an illumination system, wherein said microscope arrays operate in at least two different modes of microscopy during said scan of the scanning mechanism.

6. The imaging system of claim 5, wherein said different modes are selected from the group trans-illumination microscopy, epi-illumination microscopy, fluorescence microscopy, and two-photon microscopy.

7. The imaging system of claim 1, wherein said scanning mechanism comprises a tray and said microscope arrays comprise discrete modules removably supported by said tray.

8. A method for imaging an object with a multi-mode imaging system, comprising the following steps:
- providing a plurality of discrete two-dimensional microscope arrays for scanning the object along a single linear motion of scan, each microscope array being configured to image the object with a plurality of optical elements arranged in rows, said rows being staggered with respect to said motion of scan such that each of the optical elements images a respective continuous strip of the object alone the motion of scan, said continuous strip being substantially free of overlap with continuous strips imaged by all other optical elements of said plurality of optical elements;
- producing said scan as a result of a relative movement between the microscope arrays and the object such that each of the microscope arrays is scanning and imaging a same area of the object sequentially during a single scanning operation through said linear motion of scan across the object;
- capturing image data representative of respective images of the object while said microscope arrays are configured to operate according to different modes of operation of the imaging system and to produce correspondingly different images of the object during the scan; and
- combining the image data captured according to said different modes of operation of the imaging system.

9. The method of claim 8, further comprising registering said image data corresponding to said microscope arrays with one another according to said different modes of operation of the imaging system.

10. The method of claim 9, wherein said image data corresponding to said microscope arrays represent respectively different colors.

11. The method of claim 9, wherein said image data corresponding to said microscope arrays represent respectively different object planes.

12. The method of claim 8, further comprising providing an illumination system, wherein different microscope arrays operate in at least two different modes of microscopy during said relative movement between the microscope arrays and the object.

13. The method of claim 12, wherein said different modes are selected from the group trans-illumination microscopy, epi-illumination microscopy, fluorescence microscopy, and two-photon microscopy.

14. The method of claim 8, further comprising providing a tray and removably supporting said microscope arrays as discrete modules by said tray.

* * * * *

UNITED STATES PATENT AND TRADEMARK OFFICE
CERTIFICATE OF CORRECTION

| | |
|---|---|
| PATENT NO. | : 7,130,115 B2 |
| APPLICATION NO. | : 10/666990 |
| DATED | : October 31, 2006 |
| INVENTOR(S) | : Artur G. Olszak, Chen Liang and Michael R. Descour |

It is certified that error appears in the above-identified patent and that said Letters Patent is hereby corrected as shown below:

Title page Item (73), correct the assignee name from "Dhetrix" to --DMETRIX--.

Signed and Sealed this

Twenty-sixth Day of August, 2008

JON W. DUDAS
*Director of the United States Patent and Trademark Office*